US011672254B2

(12) United States Patent
Zee

(10) Patent No.: US 11,672,254 B2
(45) Date of Patent: Jun. 13, 2023

(54) COMPOSITIONS AND METHODS FOR CONTROLLED DELIVERY OF VOLATILE VAPORS

(71) Applicant: AUBURN UNIVERSITY, Auburn, AL (US)

(72) Inventor: Ralph H. Zee, Auburn, AL (US)

(73) Assignee: AUBURN UNIVERSITY, Auburn, AL (US)

( * ) Notice: Subject to any disclaimer, the term of this patent is extended or adjusted under 35 U.S.C. 154(b) by 0 days.

(21) Appl. No.: 17/172,455

(22) Filed: Feb. 10, 2021

(65) Prior Publication Data

US 2021/0244034 A1    Aug. 12, 2021

Related U.S. Application Data

(60) Provisional application No. 62/972,700, filed on Feb. 11, 2020.

(51) Int. Cl.
| *A01N 25/08* | (2006.01) |
| *A01N 25/18* | (2006.01) |
| *A01N 61/00* | (2006.01) |
| *A01N 65/44* | (2009.01) |
| *A01N 65/22* | (2009.01) |
| *A01N 65/36* | (2009.01) |
| *A01N 65/42* | (2009.01) |

(52) U.S. Cl.
CPC ............. *A01N 65/44* (2013.01); *A01N 25/08* (2013.01); *A01N 25/18* (2013.01); *A01N 61/00* (2013.01); *A01N 65/22* (2013.01); *A01N 65/36* (2013.01); *A01N 65/42* (2013.01)

(58) Field of Classification Search
CPC ......... A01N 65/42; A01N 25/08; A01N 25/18
See application file for complete search history.

(56) References Cited

U.S. PATENT DOCUMENTS

| 5,505,019 | A | * | 4/1996 | Paulson | ................. A01N 25/34 |
| | | | | | 106/270 |
| 5,750,128 | A | * | 5/1998 | Paulson | .............. A01M 21/043 |
| | | | | | 424/407 |
| 6,001,346 | A | * | 12/1999 | Delwiche | ............... A01N 25/18 |
| | | | | | 514/975 |
| 10,010,638 | B2 | * | 7/2018 | Banco | ....................... A61L 9/00 |
| 10,039,851 | B2 | * | 8/2018 | Tschantz | ................. C11C 5/002 |
| 2014/0335140 | A1 | * | 11/2014 | Hoag | ..................... A61K 47/46 |
| | | | | | 424/409 |
| 2015/0272133 | A1 | | 10/2015 | Freeman | |
| 2017/0209611 | A1 | * | 7/2017 | Banco | .................... A61L 9/012 |
| 2018/0325121 | A1 | | 11/2018 | Keller et al. | |

FOREIGN PATENT DOCUMENTS

| EP | 0945066 A1 | | 9/1999 |
| JP | 08053305 A | * | 2/1996 |
| JP | H08053305 A | | 2/1996 |
| WO | 02098439 A1 | | 12/2002 |

OTHER PUBLICATIONS

Capsaicin Technical Fact Sheet—National Pesticide information center, Oct. 2008, accessed http://npic.orst.edu/factsheets/archive/Capsaicintech.html on Sep. 26, 2021.*
Holland (Repel Insect Repellent Citronella Candle Review The Spruce, May 15, 2019 accessed Sep. 26, 2021 from https://www.thespruce.com/repel-citronella-candle-review-4687222).*
Maia, Marta Ferreira, and Sarah J. Moore. "Plant-based insect repellents: a review of their efficacy, development and testing." Malaria journal 10.1 (2011): 1-15. (Year: 2011).*
PCT Search Report and Written Opinion prepared for PCT/US2021/017351, completed May 20, 2021.
Plata-Rueda et al., "Insecticidal activity of garlic essential oil and their constituents against the mealworm beetle, Tenebrio molitor Linnaeus (Coleoptera: Tenebrionidae)," Scientific Reports, 2017, vol. 7, Issue: 1, pp. 1-11.
Stjernberg et al., "Garlic as an Insect Repellent," The Journal of the American Medical Association., 2000, vol. 284, Issue: 7, p. 1.

* cited by examiner

*Primary Examiner* — Bethany P Barham
*Assistant Examiner* — Peter Anthopolos
(74) *Attorney, Agent, or Firm* — Barnes & Thornburg LLP

(57) ABSTRACT

The present disclosure provides solid compositions comprising a sorbent and an active composition, as well as delivery devices comprising the solid compositions. The disclosure also provides methods of making the solid compositions, as well as methods of utilizing the solid compositions as a pest repellant and as attractant for targets.

19 Claims, 19 Drawing Sheets

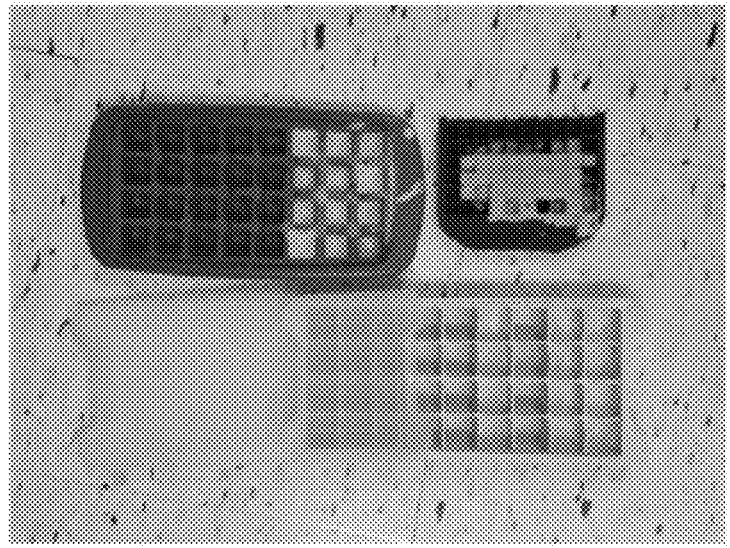
FIG. 1A
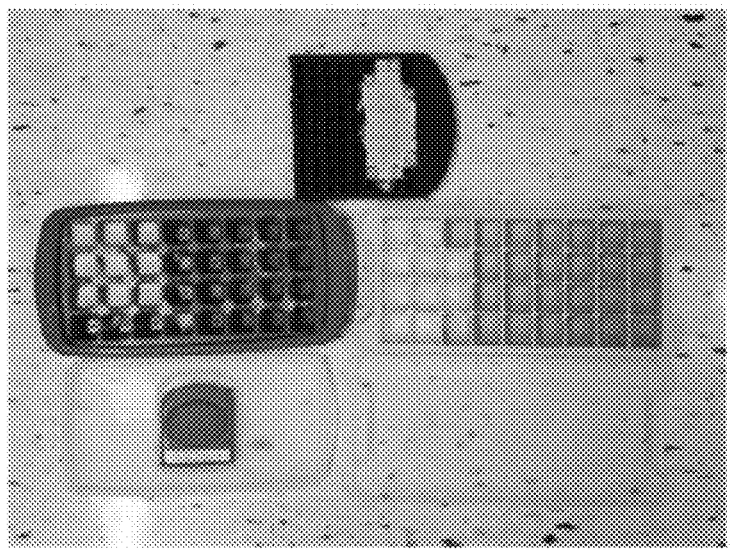
FIG. 1B
FIGS. 1A & 1B

FIG. 3A
FIG. 3B
FIGS. 3A & 3B

COMPOSITIONS AND METHODS FOR CONTROLLED DELIVERY OF VOLATILE VAPORS

CROSS-REFERENCE TO RELATED APPLICATIONS

This application claims the benefit under 35 U.S.C. § 119(e) of U.S. Provisional Application Ser. No. 62/972,700, filed on Feb. 11, 2020, the entire disclosure of which is incorporated herein by reference.

TECHNICAL FIELD

The disclosure relates to controlled release of an active composition from a solid composition. Specifically, the disclosure includes solid compositions capable of long-term release of active compositions, including volatile compositions, and methods for repelling a pest or for attracting a target utilizing the solid compositions.

BACKGROUND AND SUMMARY OF THE INVENTION

Pests can be damaging to crops and spread diseases to human populations. As a result, pests are generally undesirable in households and in commercial entities. New chemical formulations of repellants and attractants are produced to control the movement of pests with the goal of directing the pests to a particular area. Pests, broadly, include insects, arachnids, amphibians, reptiles, and even mammals (e.g., deer).

However, current formulations of pest repellants and attractants are typically liquid formulations and, as such, have numerous disadvantages. For example, sprays for controlling pests require numerous applications to provide a continuous effect. Additionally, the liquid formulations may include harmful chemicals with the potential to pollute water sources. Further, shipment of liquid formulations presents numerous challenges, including possible breaking of liquid-containing packages and unwanted spillage of liquid products. Therefore, there exists a need for alternative pest-controlling compositions that are capable of releasing a repellant or attractant for an extended period of time without the requirement of a liquid formulation.

Accordingly, the present disclosure provides solid compositions for pest control that are capable of releasing an active component in a gaseous state to provide the desired effects. The solid compositions are configured to provide controlled release of the active component and can last for an extended period of time. Further, methods of making and using the solid compositions are also provided by the present disclosure, including both methods for repelling a pest and for attracting a target using the described solid compositions.

The disclosed compositions and methods have advantages over the currently available products and practices. For instance, because the compositions of the present disclosure are solids, there is no risk of active ingredient spillage during transport or application. Additionally, the solid compositions can be configured to release an active component over a desired time period, which eliminates the need for multiple applications of the active component. Finally, because the active component is released from the solid composition in a gaseous state, water sources are not exposed to potentially harmful pollution.

BRIEF DESCRIPTION OF THE DRAWINGS

FIGS. 1A and 1B show the solid compositions in molds after formation and solidification.

FIGS. 3A and 3B show the solid compositions with containers.

In FIG. 8, the following identifiers are used: 0=0% active composition; MW5=microcrystalline wax; LS=laboratory small piece; LL=laboratory large piece; HS1=external (sun) small piece; HL1=external (sun) large piece; HS2=external (shade) small piece; and HL2=external (shade) large piece.

In FIG. 9, the following identifiers are used: 25=25% active composition; 25=45% active composition; PW=paraffin wax; MW=microcrystalline wax; 1L=laboratory sample; 2L=laboratory sample; 1H=external (sun); and 2H=external (shade).

In FIG. 10, the following identifiers are used: 45=45% oil; MW=microcrystalline wax; (2-Small)-L=laboratory small piece; (2-Large)-L=laboratory large piece; (2-Small)-H=external (sun) small piece; and (2-Large)-H=external (sun) large piece.

In FIG. 11, the following identifiers are used: 45=45% oil; MW=microcrystalline wax; LS=laboratory small piece; LM=laboratory medium piece; LL=laboratory large piece; HS1=external (sun) small piece; HM1=external (sun) medium piece; HL1=external (sun) large piece; HS2=external (shade) small piece; HM2=external (shade) medium piece; and HL2=external (shade) large piece.

In FIG. 12, the following identifiers are used: 45=45% oil; MW=microcrystalline wax; LS=laboratory small piece; LM=laboratory medium piece; LL=laboratory large piece; HS1=external (sun) small piece; HM1=external (sun) medium piece; HL1=external (sun) large piece; HS2=external (shade) small piece; HM2=external (shade) medium piece; and HL2=external (shade) large piece.

In FIG. 13, the following identifiers are used: 45=45% oil; MW=microcrystalline wax; LS=laboratory small piece; LL=laboratory large piece; HS1=external (sun) small piece; HL1=external (sun) large piece; HS2=external (shade) small piece; and HL2=external (shade) large piece.

FIG. 14A presents tests performed under laboratory conditions and FIG. 14B presents tests performed in an external setting. Change in weight (grams) is shown on the y-axis and number of days is shown on the x-axis. All containers utilized two 5/64" holes as apertures. The abrupt changes in weight at around day 225 is due to removal of the lid from the containers, which was independent of the release of active composition from the solid composition. In FIG. 14, the following identifiers are used: W=microcrystalline wax; G=garlic oil; O=orange oil; L=lavender oil; P=peppermint oil; LG=lemongrass oil; and PW=paraffin wax.

In FIG. 16, the following identifiers are used: G=garlic oil; O=orange oil; L=lavender oil; LG=lemongrass oil, and P=peppermint oil.

In FIG. 17, the following identifiers are used: #101=foam; #102=foam; #103=cotton fiber; and #104=cotton fiber/foam.

DETAILED DESCRIPTION

Figure 2:
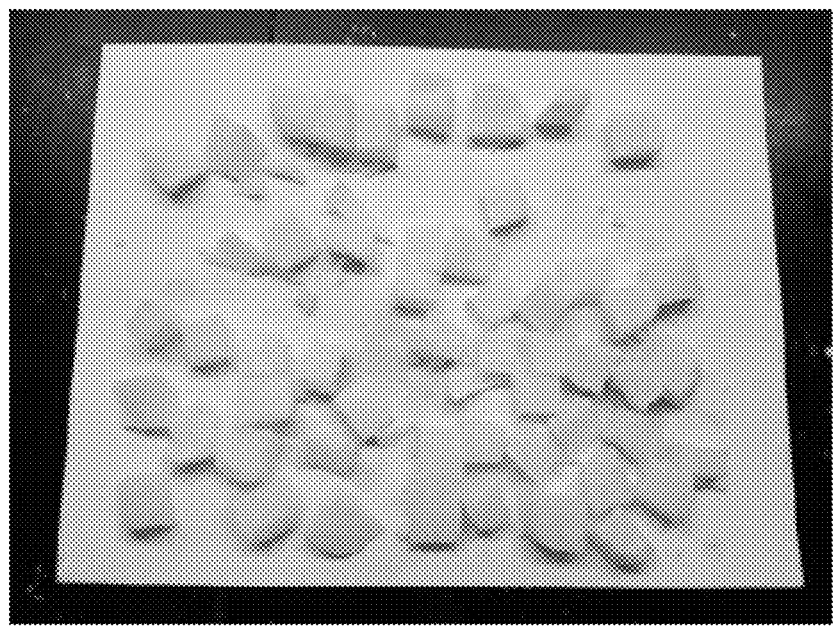
FIG. 2 shows solid compositions after formation and segmentation into smaller components.

The following numbered embodiments are contemplated and are non-limiting:

1. A solid composition comprising i) a sorbent and ii) an active composition.

2. The solid composition of clause 1, any other suitable clause, or any combination of suitable clauses, wherein the sorbent is selected from the group consisting of a wax, a cotton, a fibrous composition, and a sponge.

3. The solid composition of clause 1, any other suitable clause, or any combination of suitable clauses, wherein the sorbent is a wax.

4. The solid composition of clause 3, any other suitable clause, or any combination of suitable clauses, wherein the solid composition comprises a concentration of wax of at least 50% by volume.

5. The solid composition of clause 3, any other suitable clause, or any combination of suitable clauses, wherein the solid composition comprises a concentration of wax of at least 50% by weight.

6. The solid composition of clause 3, any other suitable clause, or any combination of suitable clauses, wherein the wax is a paraffin wax, a microcrystalline wax, or a combination thereof.

7. The solid composition of clause 3, any other suitable clause, or any combination of suitable clauses, wherein the wax is a paraffin wax.

8. The solid composition of clause 3, any other suitable clause, or any combination of suitable clauses, wherein the wax is a microcrystalline wax.

9. The solid composition of clause 1, any other suitable clause, or any combination of suitable clauses, wherein the sorbent is a cotton.

10. The solid composition of clause 9, any other suitable clause, or any combination of suitable clauses, wherein the cotton is a cotton ball.

11. The solid composition of clause 9, any other suitable clause, or any combination of suitable clauses, wherein the cotton is a cotton fabric.

12. The solid composition of clause 1, any other suitable clause, or any combination of suitable clauses, wherein the sorbent is a fibrous composition.

13. The solid composition of clause 1, any other suitable clause, or any combination of suitable clauses, wherein the sorbent is a sponge.

14. The solid composition of clause 1, any other suitable clause, or any combination of suitable clauses, wherein the active composition is a repellant composition.

15. The solid composition of clause 1, any other suitable clause, or any combination of suitable clauses, wherein the active composition is an attractant composition.

16. The solid composition of clause 1, any other suitable clause, or any combination of suitable clauses, wherein the active composition is selected from the group consisting of a garlic oil, a garlic essential oil, a garlic blend oil, an orange oil, a peppermint oil, a lavender oil, a lemongrass oil, and any combination thereof.

17. The solid composition of clause 1, any other suitable clause, or any combination of suitable clauses, wherein the active composition is a garlic oil.

18. The solid composition of clause 1, any other suitable clause, or any combination of suitable clauses, wherein the active composition is a garlic essential oil.

19. The solid composition of clause 1, any other suitable clause, or any combination of suitable clauses, wherein the active composition is a garlic blend oil.

20. The solid composition of clause 1, any other suitable clause, or any combination of suitable clauses, wherein the active composition is an orange oil.

21. The solid composition of clause 1, any other suitable clause, or any combination of suitable clauses, wherein the active composition is a peppermint oil.

22. The solid composition of clause 1, any other suitable clause, or any combination of suitable clauses, wherein the active composition is a lavender oil.

23. The solid composition of clause 1, any other suitable clause, or any combination of suitable clauses, wherein the active composition is a lemongrass oil.

24. The solid composition of clause 1, any other suitable clause, or any combination of suitable clauses, wherein the active composition comprises one or more pheromones.

25. The solid composition of clause 1, any other suitable clause, or any combination of suitable clauses, wherein the active composition is a sulfur-containing substance.

26. The solid composition of clause 1, any other suitable clause, or any combination of suitable clauses, wherein the active composition is a volatile composition.

27. The solid composition of clause 26, any other suitable clause, or any combination of suitable clauses, wherein the solid composition is capable of releasing the volatile composition for at least 100 days.

28. The solid composition of clause 27, any other suitable clause, or any combination of suitable clauses, wherein the solid composition is capable of releasing the volatile composition for at least 200 days.

29. The solid composition of clause 27, any other suitable clause, or any combination of suitable clauses, wherein the solid composition is capable of releasing the volatile composition for at least 300 days, or wherein the solid composition is capable of releasing the volatile composition for at least 400 days, or wherein the solid composition is capable of releasing the volatile composition for at least 500 days.

30. The solid composition of clause 1, any other suitable clause, or any combination of suitable clauses, wherein the active composition is a liquid composition.

31. The solid composition of clause 30, any other suitable clause, or any combination of suitable clauses, wherein the liquid composition is non-aqueous.

32. The solid composition of clause 30, any other suitable clause, or any combination of suitable clauses, wherein the liquid composition is an oil.

33. The solid composition of clause 32, any other suitable clause, or any combination of suitable clauses, wherein the oil is an essential oil.

34. The solid composition of clause 1, any other suitable clause, or any combination of suitable clauses, wherein the solid composition comprises the active composition at a concentration from about 10% to about 50% by volume.

35. The solid composition of clause 1, any other suitable clause, or any combination of suitable clauses, wherein the solid composition comprises the active composition at a concentration from about 20% to about 50% by volume.

36. The solid composition of clause 1, any other suitable clause, or any combination of suitable clauses, wherein the solid composition comprises the active composition at a concentration from about 30% to about 50% by volume.

37. The solid composition of clause 1, any other suitable clause, or any combination of suitable clauses, wherein the solid composition comprises the active composition at a concentration from about 40% to about 50% by volume.

38. The solid composition of clause 1, any other suitable clause, or any combination of suitable clauses, wherein the solid composition comprises the active composition at a concentration of about 20% by volume.

39. The solid composition of clause 1, any other suitable clause, or any combination of suitable clauses, wherein the solid composition comprises the active composition at a concentration of about 30% by volume.

40. The solid composition of clause 1, any other suitable clause, or any combination of suitable clauses, wherein the solid composition comprises the active composition at a concentration of about 40% by volume.

41. The solid composition of clause 1, any other suitable clause, or any combination of suitable clauses, wherein the solid composition comprises the active composition at a concentration of about 45% by volume.

42. The solid composition of clause 1, any other suitable clause, or any combination of suitable clauses, wherein the solid composition comprises the active composition at a concentration of about 50%.

43. The solid composition of clause 42, any other suitable clause, or any combination of suitable clauses, wherein the concentration is a volume:volume concentration measured when the sorbent and the active composition are both in liquid state.

44. The solid composition of clause 42, any other suitable clause, or any combination of suitable clauses, wherein the concentration is a weight:weight concentration measured when the sorbent and the active composition are both in liquid state.

45. The solid composition of clause 1, any other suitable clause, or any combination of suitable clauses, wherein the solid composition is not contained in a container.

46. The solid composition of clause 1, any other suitable clause, or any combination of suitable clauses, wherein the solid composition is configured in a shape to control the release of the active composition from the solid composition, wherein the active composition comprises a volatile composition.

47. The solid composition of clause 46, any other suitable clause, or any combination of suitable clauses, wherein the shape is selected from the group consisting of a sphere, a cube, a cylinder, and a disk.

48. The solid composition of clause 46, any other suitable clause, or any combination of suitable clauses, wherein the shape is a sphere.

49. The solid composition of clause 46, any other suitable clause, or any combination of suitable clauses, wherein the shape is a cube.

50. The solid composition of clause 46, any other suitable clause, or any combination of suitable clauses, wherein the shape is a cylinder.

51. The solid composition of clause 46, any other suitable clause, or any combination of suitable clauses, wherein the shape is a disk.

52. The solid composition of clause 51, any other suitable clause, or any combination of suitable clauses, wherein the disk comprises an upper flat surface and a lower flat surface.

53. The solid composition of clause 51, any other suitable clause, or any combination of suitable clauses, wherein the disk comprises a thickness.

54. The solid composition of clause 51, any other suitable clause, or any combination of suitable clauses, wherein the disk comprises a ratio between the flat surfaces and the thickness, wherein the ratio is between about 10:1 to 1:10.

55. A delivery device comprising a) a container comprising one or more apertures and b) a solid composition comprising i) a sorbent and ii) an active composition, wherein the container contains the solid composition.

56. The delivery device of clause 55, any other suitable clause, or any combination of suitable clauses, wherein the container comprises at least two apertures.

57. The delivery device of clause 55, any other suitable clause, or any combination of suitable clauses, wherein the container comprises at least three apertures.

58. The delivery device of clause 55, any other suitable clause, or any combination of suitable clauses, wherein the container comprises at least four apertures.

59. The delivery device of clause 55, any other suitable clause, or any combination of suitable clauses, wherein the container comprises at least five apertures.

60. The delivery device of clause 55, any other suitable clause, or any combination of suitable clauses, wherein the container comprises at least six apertures.

61. The delivery device of clause 55, any other suitable clause, or any combination of suitable clauses, wherein the container comprises at least eight apertures.

62. The delivery device of clause 55, any other suitable clause, or any combination of suitable clauses, wherein the aperture is a hole.

63. The delivery device of clause 55, any other suitable clause, or any combination of suitable clauses, wherein the aperture is a gap.

64. The delivery device of clause 55, any other suitable clause, or any combination of suitable clauses, wherein the aperture is an opening.

65. The delivery device of clause 55, any other suitable clause, or any combination of suitable clauses, wherein the container further comprises a lid.

66. The delivery device of clause 65, any other suitable clause, or any combination of suitable clauses, wherein the lid is removable.

67. The delivery device of clause 65, any other suitable clause, or any combination of suitable clauses, wherein the lid is non-removable.

68. The delivery device of clause 65, any other suitable clause, or any combination of suitable clauses, wherein the one or more apertures are configured on a side location of the lid.

69. The delivery device of clause 55, any other suitable clause, or any combination of suitable clauses, wherein the one or more apertures are configured on a side location of container.

70. The delivery device of clause 55, any other suitable clause, or any combination of suitable clauses, wherein the sorbent is selected from the group consisting of a wax, a cotton, a fibrous composition, and a sponge.

71. The delivery device of clause 55, any other suitable clause, or any combination of suitable clauses, wherein the sorbent is a wax.

72. The delivery device of clause 71, any other suitable clause, or any combination of suitable clauses, wherein the solid composition comprises a concentration of wax of at least 50% by volume.

73. The delivery device of clause 71, any other suitable clause, or any combination of suitable clauses, wherein the solid composition comprises a concentration of wax of at least 50% by weight.

74. The delivery device of clause 71, any other suitable clause, or any combination of suitable clauses, wherein the wax is a paraffin wax, a microcrystalline wax, or a combination thereof.

75. The delivery device of clause 71, any other suitable clause, or any combination of suitable clauses, wherein the wax is a paraffin wax.

76. The delivery device of clause 71, any other suitable clause, or any combination of suitable clauses, wherein the wax is a microcrystalline wax.

77. The delivery device of clause 55, any other suitable clause, or any combination of suitable clauses, wherein the sorbent is a cotton.

78. The delivery device of clause 77, any other suitable clause, or any combination of suitable clauses, wherein the cotton is a cotton ball.

79. The delivery device of clause 77, any other suitable clause, or any combination of suitable clauses, wherein the cotton is a cotton fabric.

80. The delivery device of clause 55, any other suitable clause, or any combination of suitable clauses, wherein the sorbent is a fibrous composition.

81. The delivery device of clause 55, any other suitable clause, or any combination of suitable clauses, wherein the sorbent is a sponge.

82. The delivery device of clause 55, any other suitable clause, or any combination of suitable clauses, wherein the active composition is a repellant composition.

83. The delivery device of clause 55, any other suitable clause, or any combination of suitable clauses, wherein the active composition is an attractant composition.

84. The delivery device of clause 55, any other suitable clause, or any combination of suitable clauses, wherein the active composition is selected from the group consisting of a garlic oil, a garlic essential oil, a garlic blend oil, an orange oil, a peppermint oil, a lavender oil, a lemongrass oil, and any combination thereof.

85. The delivery device of clause 55, any other suitable clause, or any combination of suitable clauses, wherein the active composition is a garlic oil.

86. The delivery device of clause 55, any other suitable clause, or any combination of suitable clauses, wherein the active composition is a garlic essential oil.

87. The delivery device of clause 55, any other suitable clause, or any combination of suitable clauses, wherein the active composition is a garlic blend oil.

88. The delivery device of clause 55, any other suitable clause, or any combination of suitable clauses, wherein the active composition is an orange oil.

89. The delivery device of clause 55, any other suitable clause, or any combination of suitable clauses, wherein the active composition is a peppermint oil.

90. The delivery device of clause 55, any other suitable clause, or any combination of suitable clauses, wherein the active composition is a lavender oil.

91. The delivery device of clause 55, any other suitable clause, or any combination of suitable clauses, wherein the active composition is a lemongrass oil.

92. The delivery device of clause 55, any other suitable clause, or any combination of suitable clauses, wherein the active composition comprises one or more pheromones.

93. The delivery device of clause 55, any other suitable clause, or any combination of suitable clauses, wherein the active composition is a sulfur-containing substance.

94. The delivery device of clause 55, any other suitable clause, or any combination of suitable clauses, wherein the active composition is a volatile composition.

95. The delivery device of clause 94, any other suitable clause, or any combination of suitable clauses, wherein the solid composition is capable of releasing the volatile composition for at least 100 days.

96. The delivery device of clause 95, any other suitable clause, or any combination of suitable clauses, wherein the solid composition is capable of releasing the volatile composition for at least 200 days.

97. The delivery device of clause 95, any other suitable clause, or any combination of suitable clauses, wherein the solid composition is capable of releasing the volatile composition for at least 300 days, or wherein the solid composition is capable of releasing the volatile composition for at least 400 days, or wherein the solid composition is capable of releasing the volatile composition for at least 500 days.

98. The delivery device of clause 55, any other suitable clause, or any combination of suitable clauses, wherein the active composition is a liquid composition.

99. The delivery device of clause 98, any other suitable clause, or any combination of suitable clauses, wherein the liquid composition is non-aqueous.

100. The delivery device of clause 98, any other suitable clause, or any combination of suitable clauses, wherein the liquid composition is an oil.

101. The delivery device of clause 100, any other suitable clause, or any combination of suitable clauses, wherein the oil is an essential oil.

102. The delivery device of clause 55, any other suitable clause, or any combination of suitable clauses, wherein the solid composition comprises the active composition at a concentration from about 10% to about 50% by volume.

103. The delivery device of clause 55, any other suitable clause, or any combination of suitable clauses, wherein the solid composition comprises the active composition at a concentration from about 20% to about 50% by volume.

104. The delivery device of clause 55, any other suitable clause, or any combination of suitable clauses, wherein the solid composition comprises the active composition at a concentration from about 30% to about 50% by volume.

105. The delivery device of clause 55, any other suitable clause, or any combination of suitable clauses, wherein the solid composition comprises the active composition at a concentration from about 40% to about 50% by volume.

106. The delivery device of clause 55, any other suitable clause, or any combination of suitable clauses, wherein the solid composition comprises the active composition at a concentration of about 20% by volume.

107. The delivery device of clause 55, any other suitable clause, or any combination of suitable clauses, wherein the solid composition comprises the active composition at a concentration of about 30% by volume.

108. The delivery device of clause 55, any other suitable clause, or any combination of suitable clauses, wherein the solid composition comprises the active composition at a concentration of about 40% by volume.

109. The delivery device of clause 55, any other suitable clause, or any combination of suitable clauses, wherein the solid composition comprises the active composition at a concentration of about 45% by volume.

110. The delivery device of clause 55, any other suitable clause, or any combination of suitable clauses, wherein the solid composition comprises the active composition at a concentration of about 50%.

111. The delivery device of clause 110, any other suitable clause, or any combination of suitable clauses, wherein the concentration is a volume:volume concentration measured when the sorbent and the active composition are both in liquid state.

112. The delivery device of clause 110, any other suitable clause, or any combination of suitable clauses, wherein the concentration is a weight:weight concentration measured when the sorbent and the active composition are both in liquid state.

113. The delivery device of clause 55, any other suitable clause, or any combination of suitable clauses, wherein the solid composition is not contained in a container.

114. The delivery device of clause 55, any other suitable clause, or any combination of suitable clauses, wherein the solid composition is configured in a shape to control the release of the active composition from the solid composition, wherein the active composition comprises a volatile composition.

115. The delivery device of clause 114, any other suitable clause, or any combination of suitable clauses, wherein the shape is selected from the group consisting of a sphere, a cube, a cylinder, and a disk.

116. The delivery device of clause 114, any other suitable clause, or any combination of suitable clauses, wherein the shape is a sphere.

117. The delivery device of clause 114, any other suitable clause, or any combination of suitable clauses, wherein the shape is a cube.

118. The delivery device of clause 114, any other suitable clause, or any combination of suitable clauses, wherein the shape is a cylinder.

119. The delivery device of clause 114, any other suitable clause, or any combination of suitable clauses, wherein the shape is a disk.

120. The delivery device of clause 119, any other suitable clause, or any combination of suitable clauses, wherein the disk comprises an upper flat surface and a lower flat surface.

121. The delivery device of clause 119, any other suitable clause, or any combination of suitable clauses, wherein the disk comprises a thickness.

122. The delivery device of clause 119, any other suitable clause, or any combination of suitable clauses, wherein the disk comprises a ratio between the flat surfaces and the thickness, wherein the ratio is between about 10:1 to 1:10.

123. A method of making a solid composition comprising i) a sorbent and ii) an active composition, said method comprising the steps of:

heating the sorbent to a temperature to form a liquid sorbent;

combining the liquid sorbent and the active composition to form a mixed composition; and cooling the mixed composition, wherein the mixed composition solidifies to form the solid composition.

124. The method of clause 123, any other suitable clause, or any combination of suitable clauses, wherein the method further comprises sealing the mixed composition from surrounding air.

125. The method of clause 123, any other suitable clause, or any combination of suitable clauses, wherein the method further comprises contacting the mixed composition with a mold.

126. The method of clause 125, any other suitable clause, or any combination of suitable clauses, wherein the mold has a shape of a cube.

127. The method of clause 125, any other suitable clause, or any combination of suitable clauses, wherein the mold has a shape of a cylinder.

128. The method of clause 127, any other suitable clause, or any combination of suitable clauses, wherein the cylinder comprises an upper flat surface and a lower flat surface.

129. The method of clause 125, any other suitable clause, or any combination of suitable clauses, wherein the mold has the shape of a disk.

130. The method of clause 129, any other suitable clause, or any combination of suitable clauses, wherein the disk comprises an upper flat surface and a lower flat surface.

131. The method of clause 129, any other suitable clause, or any combination of suitable clauses, wherein the disk comprises a thickness.

132. The method of clause 129, any other suitable clause, or any combination of suitable clauses, wherein the disk comprises a ratio between the flat surfaces and the thickness, wherein the thickness is between about 10:1 to 1:10.

133. The method of clause 123, any other suitable clause, or any combination of suitable clauses, wherein the sorbent is selected from the group consisting of a wax, a cotton, a fibrous composition, and a sponge.

134. The method of clause 123, any other suitable clause, or any combination of suitable clauses, wherein the sorbent is a wax.

135. The method of clause 134, any other suitable clause, or any combination of suitable clauses, wherein the solid composition comprises a concentration of wax of at least 50% by volume.

136. The method of clause 134, any other suitable clause, or any combination of suitable clauses, wherein the solid composition comprises a concentration of wax of at least 50% by weight.

137. The method of clause 134, any other suitable clause, or any combination of suitable clauses, wherein the wax is a paraffin wax, a microcrystalline wax, or a combination thereof.

138. The method of clause 134, any other suitable clause, or any combination of suitable clauses, wherein the wax is a paraffin wax.

139. The method of clause 134, any other suitable clause, or any combination of suitable clauses, wherein the wax is a microcrystalline wax.

140. The method of clause 123, any other suitable clause, or any combination of suitable clauses, wherein the sorbent is a cotton.

141. The method of clause 140, any other suitable clause, or any combination of suitable clauses, wherein the cotton is a cotton ball.

142. The method of clause 140, any other suitable clause, or any combination of suitable clauses, wherein the cotton is a cotton fabric.

143. The method of clause 123, any other suitable clause, or any combination of suitable clauses, wherein the sorbent is a fibrous composition.

144. The method of clause 123, any other suitable clause, or any combination of suitable clauses, wherein the sorbent is a sponge.

145. The method of clause 123, any other suitable clause, or any combination of suitable clauses, wherein the active composition is a repellant composition.

146. The method of clause 123, any other suitable clause, or any combination of suitable clauses, wherein the active composition is an attractant composition.

147. The method of clause 123, any other suitable clause, or any combination of suitable clauses, wherein the active composition is selected from the group consisting of a garlic oil, a garlic essential oil, a garlic blend oil, an orange oil, a peppermint oil, a lavender oil, a lemongrass oil, and any combination thereof.

148. The method of clause 123, any other suitable clause, or any combination of suitable clauses, wherein the active composition is a garlic oil.

149. The method of clause 123, any other suitable clause, or any combination of suitable clauses, wherein the active composition is a garlic essential oil.

150. The method of clause 123, any other suitable clause, or any combination of suitable clauses, wherein the active composition is a garlic blend oil.

151. The method of clause 123, any other suitable clause, or any combination of suitable clauses, wherein the active composition is an orange oil.

152. The method of clause 123, any other suitable clause, or any combination of suitable clauses, wherein the active composition is a peppermint oil.

153. The method of clause 123, any other suitable clause, or any combination of suitable clauses, wherein the active composition is a lavender oil.

154. The method of clause 123, any other suitable clause, or any combination of suitable clauses, wherein the active composition is a lemongrass oil.

155. The method of clause 123, any other suitable clause, or any combination of suitable clauses, wherein the active composition comprises one or more pheromones.

156. The method of clause 123, any other suitable clause, or any combination of suitable clauses, wherein the active composition is a sulfur-containing substance.

157. The method of clause 123, any other suitable clause, or any combination of suitable clauses, wherein the active composition is a volatile composition.

158. The method of clause 157, any other suitable clause, or any combination of suitable clauses, wherein the solid composition is capable of releasing the volatile composition for at least 100 days.

159. The method of clause 158, any other suitable clause, or any combination of suitable clauses, wherein the solid composition is capable of releasing the volatile composition for at least 200 days.

160. The method of clause 158, any other suitable clause, or any combination of suitable clauses, wherein the solid composition is capable of releasing the volatile composition for at least 300 days, or wherein the solid composition is capable of releasing the volatile composition for at least 400 days, or wherein the solid composition is capable of releasing the volatile composition for at least 500 days.

161. The method of clause 123, any other suitable clause, or any combination of suitable clauses, wherein the active composition is a liquid composition.

162. The method of clause 161, any other suitable clause, or any combination of suitable clauses, wherein the liquid composition is non-aqueous.

163. The method of clause 161, any other suitable clause, or any combination of suitable clauses, wherein the liquid composition is an oil.

164. The method of clause 163, any other suitable clause, or any combination of suitable clauses, wherein the oil is an essential oil.

165. The method of clause 123, any other suitable clause, or any combination of suitable clauses, wherein the solid composition comprises the active composition at a concentration from about 10% to about 50% by volume.

166. The method of clause 123, any other suitable clause, or any combination of suitable clauses, wherein the solid composition comprises the active composition at a concentration from about 20% to about 50% by volume.

167. The method of clause 123, any other suitable clause, or any combination of suitable clauses, wherein the solid composition comprises the active composition at a concentration from about 30% to about 50% by volume.

168. The method of clause 123, any other suitable clause, or any combination of suitable clauses, wherein the solid composition comprises the active composition at a concentration from about 40% to about 50% by volume.

169. The method of clause 123, any other suitable clause, or any combination of suitable clauses, wherein the solid composition comprises the active composition at a concentration of about 20% by volume.

170. The method of clause 123, any other suitable clause, or any combination of suitable clauses, wherein the solid composition comprises the active composition at a concentration of about 30% by volume.

171. The method of clause 123, any other suitable clause, or any combination of suitable clauses, wherein the solid composition comprises the active composition at a concentration of about 40% by volume.

172. The method of clause 123, any other suitable clause, or any combination of suitable clauses, wherein the solid composition comprises the active composition at a concentration of about 45% by volume.

173. The method of clause 123, any other suitable clause, or any combination of suitable clauses, wherein the solid composition comprises the active composition at a concentration of about 50%.

174. The method of clause 173, any other suitable clause, or any combination of suitable clauses, wherein the concentration is a volume:volume concentration measured when the sorbent and the active composition are both in liquid state.

175. The method of clause 173, any other suitable clause, or any combination of suitable clauses, wherein the concentration is a weight:weight concentration measured when the sorbent and the active composition are both in liquid state.

176. The method of clause 123, any other suitable clause, or any combination of suitable clauses, wherein the solid composition is not contained in a container.

177. The method of clause 123, any other suitable clause, or any combination of suitable clauses, wherein the solid composition is configured in a shape to control the release of the active composition from the solid composition, wherein the active composition comprises a volatile composition.

178. The method of clause 177, any other suitable clause, or any combination of suitable clauses, wherein the shape is selected from the group consisting of a sphere, a cube, a cylinder, and a disk.

179. The method of clause 177, any other suitable clause, or any combination of suitable clauses, wherein the shape is a sphere.

180. The method of clause 177, any other suitable clause, or any combination of suitable clauses, wherein the shape is a cube.

181. The method of clause 177, any other suitable clause, or any combination of suitable clauses, wherein the shape is a cylinder.

182. The method of clause 177, any other suitable clause, or any combination of suitable clauses, wherein the shape is a disk.

183. The method of clause 182, any other suitable clause, or any combination of suitable clauses, wherein the disk comprises an upper flat surface and a lower flat surface.

184. The method of clause 182, any other suitable clause, or any combination of suitable clauses, wherein the disk comprises a thickness.

185. The method of clause 182, any other suitable clause, or any combination of suitable clauses, wherein the disk comprises a ratio between the flat surfaces and the thickness, wherein the ratio is between about 10:1 to 1:10.

186. A method of repelling a pest, said method comprising the step of A) placing a solid composition comprising i) a sorbent and ii) an active composition or B) placing a delivery device comprising a) a container comprising one or more apertures and b) the solid composition, wherein the container contains the solid composition, in an area wherein the pest may be present.

187. The method of clause 186, any other suitable clause, or any combination of suitable clauses, wherein the pest is an insect.

188. The method of clause 187, any other suitable clause, or any combination of suitable clauses, wherein the insect is a mosquito.

189. The method of clause 187, any other suitable clause, or any combination of suitable clauses, wherein the insect is a psyllidae.

190. The method of clause 187, any other suitable clause, or any combination of suitable clauses, wherein the insect is a beetle.

191. The method of clause 190, any other suitable clause, or any combination of suitable clauses, wherein the beetle is a pine beetle.

192. The method of clause 186, any other suitable clause, or any combination of suitable clauses, wherein the pest is an arachnid.

193. The method of clause 186, any other suitable clause, or any combination of suitable clauses, wherein the pest is a rodent.

194. The method of clause 186, any other suitable clause, or any combination of suitable clauses, wherein the pest is a reptile.

195. The method of clause 186, any other suitable clause, or any combination of suitable clauses, wherein the pest is a snake.

196. The method of clause 186, any other suitable clause, or any combination of suitable clauses, wherein the pest is a scorpion.

197. The method of clause 186, any other suitable clause, or any combination of suitable clauses, wherein the pest is a bat.

198. The method of clause 186, any other suitable clause, or any combination of suitable clauses, wherein the sorbent is selected from the group consisting of a wax, a cotton, a fibrous composition, and a sponge.

199. The method of clause 186, any other suitable clause, or any combination of suitable clauses, wherein the sorbent is a wax.

200. The method of clause 199, any other suitable clause, or any combination of suitable clauses, wherein the solid composition comprises a concentration of wax of at least 50% by volume.

201. The method of clause 199, any other suitable clause, or any combination of suitable clauses, wherein the solid composition comprises a concentration of wax of at least 50% by weight.

202. The method of clause 199, any other suitable clause, or any combination of suitable clauses, wherein the wax is a paraffin wax, a microcrystalline wax, or a combination thereof.

203. The method of clause 199, any other suitable clause, or any combination of suitable clauses, wherein the wax is a paraffin wax.

204. The method of clause 199, any other suitable clause, or any combination of suitable clauses, wherein the wax is a microcrystalline wax.

205. The method of clause 186, any other suitable clause, or any combination of suitable clauses, wherein the sorbent is a cotton, and wherein the cotton is a cotton ball or a cotton fabric.

206. The method of clause 186, any other suitable clause, or any combination of suitable clauses, wherein the sorbent is a fibrous composition.

207. The method of clause 186, any other suitable clause, or any combination of suitable clauses, wherein the sorbent is a sponge.

208. The method of clause 186, any other suitable clause, or any combination of suitable clauses, wherein the active composition is a repellant composition.

209. The method of clause 186, any other suitable clause, or any combination of suitable clauses, wherein the active composition is an attractant composition.

210. The method of clause 186, any other suitable clause, or any combination of suitable clauses, wherein the active composition is selected from the group consisting of a garlic oil, a garlic essential oil, a garlic blend oil, an orange oil, a peppermint oil, a lavender oil, a lemongrass oil, and any combination thereof.

211. The method of clause 186, any other suitable clause, or any combination of suitable clauses, wherein the active composition is a garlic oil.

212. The method of clause 186, any other suitable clause, or any combination of suitable clauses, wherein the active composition is a garlic essential oil.

213. The method of clause 186, any other suitable clause, or any combination of suitable clauses, wherein the active composition is a garlic blend oil.

214. The method of clause 186, any other suitable clause, or any combination of suitable clauses, wherein the active composition is an orange oil.

215. The method of clause 186, any other suitable clause, or any combination of suitable clauses, wherein the active composition is a peppermint oil.

216. The method of clause 186, any other suitable clause, or any combination of suitable clauses, wherein the active composition is a lavender oil.

217. The method of clause 186, any other suitable clause, or any combination of suitable clauses, wherein the active composition is a lemongrass oil.

218. The method of clause 186, any other suitable clause, or any combination of suitable clauses, wherein the active composition comprises one or more pheromones.

219. The method of clause 186, any other suitable clause, or any combination of suitable clauses, wherein the active composition is a sulfur-containing substance.

220. The method of clause 186, any other suitable clause, or any combination of suitable clauses, wherein the active composition is a volatile composition.

221. The method of clause 220, any other suitable clause, or any combination of suitable clauses, wherein the solid composition is capable of releasing the volatile composition for at least 100 days.

222. The method of clause 221, any other suitable clause, or any combination of suitable clauses, wherein the solid composition is capable of releasing the volatile composition for at least 200 days.

223. The method of clause 221, any other suitable clause, or any combination of suitable clauses, wherein the solid composition is capable of releasing the volatile composition for at least 300 days, or wherein the solid composition is capable of releasing the volatile composition for at least 400 days, or wherein the solid composition is capable of releasing the volatile composition for at least 500 days.

224. The method of clause 186, any other suitable clause, or any combination of suitable clauses, wherein the active composition is a liquid composition.

225. The method of clause 224, any other suitable clause, or any combination of suitable clauses, wherein the liquid composition is non-aqueous.

226. The method of clause 224, any other suitable clause, or any combination of suitable clauses, wherein the liquid composition is an oil.

227. The method of clause 226, any other suitable clause, or any combination of suitable clauses, wherein the oil is an essential oil.

228. The method of clause 186, any other suitable clause, or any combination of suitable clauses, wherein the solid composition comprises the active composition at a concentration from about 10% to about 50% by volume.

229. The method of clause 186, any other suitable clause, or any combination of suitable clauses, wherein the solid composition comprises the active composition at a concentration from about 20% to about 50% by volume.

230. The method of clause 186, any other suitable clause, or any combination of suitable clauses, wherein the solid composition comprises the active composition at a concentration from about 30% to about 50% by volume.

231. The method of clause 186, any other suitable clause, or any combination of suitable clauses, wherein the solid composition comprises the active composition at a concentration from about 40% to about 50% by volume.

232. The method of clause 186, any other suitable clause, or any combination of suitable clauses, wherein the solid composition comprises the active composition at a concentration of about 20% by volume.

233. The method of clause 186, any other suitable clause, or any combination of suitable clauses, wherein the solid composition comprises the active composition at a concentration of about 30% by volume.

234. The method of clause 186, any other suitable clause, or any combination of suitable clauses, wherein the solid composition comprises the active composition at a concentration of about 40% by volume.

235. The method of clause 186, any other suitable clause, or any combination of suitable clauses, wherein the solid composition comprises the active composition at a concentration of about 45% by volume.

236. The method of clause 186, any other suitable clause, or any combination of suitable clauses, wherein the solid composition comprises the active composition at a concentration of about 50%.

237. The method of clause 236, any other suitable clause, or any combination of suitable clauses, wherein the concentration is a volume:volume concentration measured when the sorbent and the active composition are both in liquid state.

238. The method of clause 236, any other suitable clause, or any combination of suitable clauses, wherein the concentration is a weight:weight concentration measured when the sorbent and the active composition are both in liquid state.

239. The method of clause 186, any other suitable clause, or any combination of suitable clauses, wherein the solid composition is not contained in a container.

240. The method of clause 186, any other suitable clause, or any combination of suitable clauses, wherein the solid composition is configured in a shape to control the release of the active composition from the solid composition, wherein the active composition comprises a volatile composition.

241. The method of clause 240, any other suitable clause, or any combination of suitable clauses, wherein the shape is selected from the group consisting of a sphere, a cube, a cylinder, and a disk.

242. The method of clause 240, any other suitable clause, or any combination of suitable clauses, wherein the shape is a sphere.

243. The method of clause 240, any other suitable clause, or any combination of suitable clauses, wherein the shape is a cube.

244. The method of clause 240, any other suitable clause, or any combination of suitable clauses, wherein the shape is a cylinder.

245. The method of clause 240, any other suitable clause, or any combination of suitable clauses, wherein the shape is a disk.

246. The method of clause 245, any other suitable clause, or any combination of suitable clauses, wherein the disk comprises an upper flat surface and a lower flat surface.

247. The method of clause 245, any other suitable clause, or any combination of suitable clauses, wherein the disk comprises a thickness.

248. The method of clause 245, any other suitable clause, or any combination of suitable clauses, wherein the disk comprises a ratio between the flat surfaces and the thickness, wherein the ratio is between about 10:1 to 1:10.

249. A method of attracting a target, said method comprising the step of A) placing a solid composition comprising i) a sorbent and ii) an active composition or B) placing a delivery device comprising a) a container comprising one or more apertures and b) the solid composition, wherein the container contains the solid composition, in an area wherein the target may be present.

250. The method of clause 249, any other suitable clause, or any combination of suitable clauses, wherein the target is an insect.

251. The method of clause 250, any other suitable clause, or any combination of suitable clauses, wherein the insect is a moth.

252. The method of clause 249, any other suitable clause, or any combination of suitable clauses, wherein the target is an arachnid.

253. The method of clause 249, any other suitable clause, or any combination of suitable clauses, wherein the target is a rodent.

254. The method of clause 249, any other suitable clause, or any combination of suitable clauses, wherein the target is a reptile.

255. The method of clause 249, any other suitable clause, or any combination of suitable clauses, wherein the target is a snake.

256. The method of clause 249, any other suitable clause, or any combination of suitable clauses, wherein the target is a scorpion.

257. The method of clause 249, any other suitable clause, or any combination of suitable clauses, wherein the target is a bat.

258. The method of clause 249, any other suitable clause, or any combination of suitable clauses, wherein the sorbent is selected from the group consisting of a wax, a cotton, a fibrous composition, and a sponge.

259. The method of clause 249, any other suitable clause, or any combination of suitable clauses, wherein the sorbent is a wax.

260. The method of clause 259, any other suitable clause, or any combination of suitable clauses, wherein the solid composition comprises a concentration of wax of at least 50% by volume.

261. The method of clause 259, any other suitable clause, or any combination of suitable clauses, wherein the solid composition comprises a concentration of wax of at least 50% by weight.

262. The method of clause 259, any other suitable clause, or any combination of suitable clauses, wherein the wax is a paraffin wax, a microcrystalline wax, or a combination thereof.

263. The method of clause 259, any other suitable clause, or any combination of suitable clauses, wherein the wax is a paraffin wax.

264. The method of clause 259, any other suitable clause, or any combination of suitable clauses, wherein the wax is a microcrystalline wax.

265. The method of clause 249, any other suitable clause, or any combination of suitable clauses, wherein the sorbent is a cotton.

266. The method of clause 265, any other suitable clause, or any combination of suitable clauses, wherein the cotton is a cotton ball.

267. The method of clause 265, any other suitable clause, or any combination of suitable clauses, wherein the cotton is a cotton fabric.

268. The method of clause 249, any other suitable clause, or any combination of suitable clauses, wherein the sorbent is a fibrous composition.

269. The method of clause 249, any other suitable clause, or any combination of suitable clauses, wherein the sorbent is a sponge.

270. The method of clause 249, any other suitable clause, or any combination of suitable clauses, wherein the active composition is a repellant composition.

271. The method of clause 249, any other suitable clause, or any combination of suitable clauses, wherein the active composition is an attractant composition.

272. The method of clause 249, any other suitable clause, or any combination of suitable clauses, wherein the active composition is selected from the group consisting of a garlic oil, a garlic essential oil, a garlic blend oil, an orange oil, a peppermint oil, a lavender oil, a lemongrass oil, and any combination thereof.

273. The method of clause 249, any other suitable clause, or any combination of suitable clauses, wherein the active composition is a garlic oil.

274. The method of clause 249, any other suitable clause, or any combination of suitable clauses, wherein the active composition is a garlic essential oil.

275. The method of clause 249, any other suitable clause, or any combination of suitable clauses, wherein the active composition is a garlic blend oil.

276. The method of clause 249, any other suitable clause, or any combination of suitable clauses, wherein the active composition is an orange oil.

277. The method of clause 249, any other suitable clause, or any combination of suitable clauses, wherein the active composition is a peppermint oil.

278. The method of clause 249, any other suitable clause, or any combination of suitable clauses, wherein the active composition is a lavender oil.

279. The method of clause 249, any other suitable clause, or any combination of suitable clauses, wherein the active composition is a lemongrass oil.

280. The method of clause 249, any other suitable clause, or any combination of suitable clauses, wherein the active composition comprises one or more pheromones.

281. The method of clause 249, any other suitable clause, or any combination of suitable clauses, wherein the active composition is a sulfur-containing substance.

282. The method of clause 249, any other suitable clause, or any combination of suitable clauses, wherein the active composition is a volatile composition.

283. The method of clause 282, any other suitable clause, or any combination of suitable clauses, wherein the solid composition is capable of releasing the volatile composition for at least 100 days.

284. The method of clause 282, any other suitable clause, or any combination of suitable clauses, wherein the solid composition is capable of releasing the volatile composition for at least 200 days.

285. The method of clause 282, any other suitable clause, or any combination of suitable clauses, wherein the solid composition is capable of releasing the volatile composition for at least 300 days, or wherein the solid composition is capable of releasing the volatile composition for at least 400 days, or wherein the solid composition is capable of releasing the volatile composition for at least 500 days.

286. The method of clause 249, any other suitable clause, or any combination of suitable clauses, wherein the active composition is a liquid composition.

287. The method of clause 286, any other suitable clause, or any combination of suitable clauses, wherein the liquid composition is non-aqueous.

288. The method of clause 286, any other suitable clause, or any combination of suitable clauses, wherein the liquid composition is an oil.

289. The method of clause 288, any other suitable clause, or any combination of suitable clauses, wherein the oil is an essential oil.

290. The method of clause 249, any other suitable clause, or any combination of suitable clauses, wherein the solid composition comprises the active composition at a concentration from about 10% to about 50% by volume.

291. The method of clause 249, any other suitable clause, or any combination of suitable clauses, wherein the solid composition comprises the active composition at a concentration from about 20% to about 50% by volume.

292. The method of clause 249, any other suitable clause, or any combination of suitable clauses, wherein the solid composition comprises the active composition at a concentration from about 30% to about 50% by volume.

293. The method of clause 249, any other suitable clause, or any combination of suitable clauses, wherein the solid composition comprises the active composition at a concentration from about 40% to about 50% by volume.

294. The method of clause 249, any other suitable clause, or any combination of suitable clauses, wherein the solid composition comprises the active composition at a concentration of about 20% by volume.

295. The method of clause 249, any other suitable clause, or any combination of suitable clauses, wherein the solid composition comprises the active composition at a concentration of about 30% by volume.

296. The method of clause 249, any other suitable clause, or any combination of suitable clauses, wherein the solid composition comprises the active composition at a concentration of about 40% by volume.

297. The method of clause 249, any other suitable clause, or any combination of suitable clauses, wherein the solid composition comprises the active composition at a concentration of about 45% by volume.

298. The method of clause 249, any other suitable clause, or any combination of suitable clauses, wherein the solid composition comprises the active composition at a concentration of about 50%.

299. The method of clause 298, any other suitable clause, or any combination of suitable clauses, wherein the concentration is a volume:volume concentration measured when the sorbent and the active composition are both in liquid state.

300. The method of clause 298, any other suitable clause, or any combination of suitable clauses, wherein the concentration is a weight:weight concentration measured when the sorbent and the active composition are both in liquid state.

301. The method of clause 249, any other suitable clause, or any combination of suitable clauses, wherein the solid composition is not contained in a container.

302. The method of clause 249, any other suitable clause, or any combination of suitable clauses, wherein the solid composition is configured in a shape to control the release of the active composition from the solid composition, wherein the active composition comprises a volatile composition.

303. The method of clause 302, any other suitable clause, or any combination of suitable clauses, wherein the shape is selected from the group consisting of a sphere, a cube, a cylinder, and a disk.

304. The method of clause 302, any other suitable clause, or any combination of suitable clauses, wherein the shape is a sphere.

305. The method of clause 302, any other suitable clause, or any combination of suitable clauses, wherein the shape is a cube.

306. The method of clause 302, any other suitable clause, or any combination of suitable clauses, wherein the shape is a cylinder.

307. The method of clause 302, any other suitable clause, or any combination of suitable clauses, wherein the shape is a disk.

308. The method of clause 307, any other suitable clause, or any combination of suitable clauses, wherein the disk comprises an upper flat surface and a lower flat surface.

309. The method of clause 307, any other suitable clause, or any combination of suitable clauses, wherein the disk comprises a thickness.

310. The method of clause 307, any other suitable clause, or any combination of suitable clauses, wherein the disk comprises a ratio between the flat surfaces and the thickness, wherein the ratio is between about 10:1 to 1:10.

In an illustrative aspect, a solid composition is provided. The solid composition comprises i) a sorbent and ii) an active composition. A solid composition as described herein can take the form of a stiff form and/or a firm form and/or a non-pourable form as generally known in the art.

In one embodiment, the sorbent is selected from the group consisting of a wax, a cotton, a fibrous composition, and a sponge.

In some embodiments, the solid composition comprises an amount of sorbent of at least 50%, at least 55%, at least 60%, at least 65%, at least 70%, at least 75%, at least 80%, at least 85%, at least 90%, or at least 95% by volume. In some embodiments, the solid composition comprises an amount of sorbent of at least 50%, at least 55%, at least 60%, at least 65%, at least 70%, at least 75%, at least 80%, at least 85%, at least 90%, or at least 95% by weight. In some embodiments, the solid composition comprises an amount of sorbent of about 50% to about 95% by weight or by volume. In some embodiments, the solid composition comprises an amount of sorbent of about 50% to about 90% by weight or by volume. In some embodiments, the solid composition comprises an amount of sorbent of about 50% to about 75% by weight or by volume. In some embodiments, the solid composition comprises an amount of sorbent of about 50% to about 65% by weight or by volume. In some embodiments, the solid composition comprises an amount of sorbent of about 50% to about 55% by weight or volume.

In some embodiments, the sorbent comprises a cotton. In some embodiments, the sorbent is a cotton. In some embodiments, the cotton is a cotton ball. In some embodiments, the cotton is a cotton fabric.

In some embodiments, the sorbent is a fibrous composition. In some embodiments, the sorbent is a sponge.

In some embodiments, the sorbent comprises a wax. In some embodiments, the sorbent is a wax. In some embodiments, the solid composition comprises a concentration of wax of at least 50% by volume. In some embodiments, the solid composition comprises a concentration of wax of at least 50% by weight.

In some embodiments, the solid composition comprises a concentration of wax of at least 50%, at least 55%, at least 60%, at least 65%, at least 70%, at least 75%, at least 80%, at least 85%, at least 90%, or at least 95% by volume. In some embodiments, the solid composition comprises a concentration of wax of at least 50%, at least 55%, at least 60%, at least 65%, at least 70%, at least 75%, at least 80%, at least 85%, at least 90%, or at least 95% by weight. In some embodiments, the solid composition comprises a concentration of wax of about 50% to about 95% by weight or by volume. In some embodiments, the solid composition comprises a concentration of wax of about 50% to about 90% by weight or by volume. In some embodiments, the solid composition comprises a concentration of wax of about 50% to about 75% by weight or by volume. In some embodiments, the solid composition comprises a concentration of wax of about 50% to about 65% by weight or by volume. In some embodiments, the solid composition comprises a concentration of wax of about 50% to about 55% by weight or volume.

In some embodiments, the wax comprises a paraffin wax, a microcrystalline wax, or a combination thereof. In some embodiments, the wax is a paraffin wax, a microcrystalline wax, or a combination thereof. In some embodiments, the wax is a paraffin wax. In some embodiments, the wax is a microcrystalline wax.

In some embodiments, the active composition is a repellant composition. In some embodiments, the active composition is an attractant composition. In some embodiments, the active composition is selected from the group consisting of a garlic oil, a garlic essential oil, a garlic blend oil, an orange oil, a peppermint oil, a lavender oil, a lemongrass oil, and any combination thereof. In some embodiments, the active composition is a garlic oil. In some embodiments, the active composition is a garlic essential oil. In some embodiments, the active composition is a garlic blend oil. In some embodiments, the active composition is an orange oil. In some embodiments, the active composition is a peppermint oil. In some embodiments, the active composition is a lavender oil. In some embodiments, the active composition is a lemongrass oil.

In some embodiments, the active composition comprises one or more pheromones. In some embodiments, the active composition is a sulfur-containing substance. In some embodiments, the active composition is a volatile composition.

In some embodiments, the solid composition is capable of releasing the volatile composition for at least 100 days. In some embodiments, the solid composition is capable of releasing the volatile composition for at least 200 days. In some embodiments, the solid composition is capable of releasing the volatile composition for at least 300 days. In some embodiments, the solid composition is capable of releasing the volatile composition for at least 400 days. In some embodiments, the solid composition is capable of releasing the volatile composition for at least 500 days.

In some embodiments, the active composition is a liquid composition. In some embodiments, the liquid composition is non-aqueous. In some embodiments, the liquid is an essential oil.

In some embodiments, the solid composition comprises an active composition at a concentration from about 30% to about 50% by volume. In some embodiments, the solid composition comprises an active composition at a concentration from about 30% to about 50% by weight. In some embodiments, the solid composition comprises an active composition at a concentration from about 40% to about 50% by volume or by weight. In some embodiments, the solid composition comprises an active composition at a concentration of about 20%, about 25%, about 30%, about 35%, about 40%, about 45%, or about 50% by volume. In some embodiments, the solid composition comprises an active composition at a concentration of less than about 50% by volume. In some embodiments, the solid composition comprises an active composition at a concentration of less than about 45% by volume. In some embodiments, the solid composition comprises an active composition at a concentration of less than about 30% by volume. In some embodiments, the solid composition comprises an active composition at a concentration of less than about 25% by volume.

In some embodiments, the concentration is a volume:volume concentration measured when the sorbent and the active composition are both in liquid state. In some embodiments, the concentration is a weight:weight concentration measured when the sorbent and the active composition are both in liquid state.

In some embodiments, the solid composition is not contained in a container.

In some embodiments, the solid composition is configured in a shape to control the release of the active composition from the solid composition. In some embodiments, the solid composition is configured in a shape to control the release of the active composition from the solid composition and wherein the active composition comprises a volatile composition.

In some embodiments, the shape is selected from the group consisting of a sphere, a cube, a cylinder, and a disk. In some embodiments, the shape is a sphere. In some embodiments, the shape is a cube. In some embodiments, the shape is a cylinder. In some embodiments the shape is a disk.

In some embodiments, the disk comprises an upper flat surface and a lower flat surface. In some embodiments, the disk comprises a thickness. In some embodiments, the disk comprises a ratio between the flat surfaces and the thickness. In some embodiments, the ratio between the flat surfaces and the thickness is between about 10:1 to 1:10.

In an illustrative aspect, a delivery device is provided. In some embodiments, the delivery device comprises i) a container comprising one or more apertures, and ii) a solid composition comprising a sorbent and an active composition, and wherein the container contains the solid composition. The previously described embodiments of the solid composition are applicable to the delivery device described herein.

In some embodiments, the container comprises at least two apertures. In some embodiments, the container comprises at least three apertures. In some embodiments, the container comprises at least four apertures. In some embodiments, the container comprises at least five apertures. In some embodiments, the container comprises at least six apertures. In some embodiments, the container comprises at least seven apertures. In some embodiments, the container comprises at least eight apertures.

In some embodiments, the aperture is a hole. In some embodiments, the aperture is a gap. In some embodiments, the aperture is an opening. In some embodiments, the aperture comprises a cover to control the size of the hole, gap, or opening. In this way, it is believed that the release of the active compound can be further controlled. Herein, "release" refers to the amount of active compound released and the time period over which it is released from the solid composition.

In some embodiments, the container further comprises a lid. In some embodiments, the lid is removable. In some embodiments, the lid is non-removable. In some embodiments, the one or more apertures are configured on a side location of the lid. In some embodiments, the one or more apertures are configured on a side location of the container.

In an illustrative aspect, a method of making a solid composition comprising a i) a sorbent and ii) an active composition is provided. In some embodiments, the method comprising i) a sorbent and ii) an active composition, said method comprising the steps of: i) heating the sorbent to a temperature to form a liquid sorbent; ii) combining the liquid sorbent and the active composition to form a mixed composition; and iii) cooling the mixed composition, wherein the mixed composition solidifies to form the solid composition.

In some embodiments, the method further comprises sealing the mixed composition from the surrounding air. In some embodiments, the method further comprises contacting the mixed composition with a mold.

In some embodiments, the mold has a shape. In some embodiments, the mold has a shape selected from a cube, a cylinder, a sphere, or a disk. In some embodiments, the mold has the shape of a cube. In some embodiments, the mold has the shape of a sphere. In some embodiments, the mold has the shape of a cylinder. In some embodiments, the cylinder comprises an upper flat surface and a lower flat surface.

In some embodiments, the mold has the shape of a disk. In some embodiments, the disk comprises an upper flat surface and a lower flat surface. In some embodiments, the disk comprises a thickness. In some embodiments, the disk comprises a ratio between the flat surfaces and the thickness. In some embodiments, the ratio between the flat surfaces and the thickness is between about 10:1 to 1:10.

In an illustrative aspect, a method of repelling a pest is provided. In some embodiments, the method comprises the step of placing a solid composition in an area where pests may be present. The previously described embodiments of the solid composition are applicable to the method of repelling a pest described herein. In some embodiments, the method further comprises containing the solid composition in a delivery device. The previously described embodiments of the delivery device are applicable to the method of repelling a pest described herein.

In some embodiments, the pest is an insect. In some embodiments, the insect is selected from the group consisting of a mosquito, a psyllidae, and a beetle. In some embodiments, the insect is a mosquito. In some embodiments, the insect is a psyllidae. In some embodiments, the insect is a beetle. In some embodiments, the beetle is a pine beetle.

In some embodiments, the pest is an arachnid. In some embodiments, the pest is a rodent. In some embodiments, the pest is a reptile. In some embodiments, the reptile is a snake. In some embodiments, the pest is a scorpion. In some embodiments, the pest is a mammal. In some embodiments, the mammal is a deer. In some embodiments, the mammal is a bat.

In an illustrative aspect, a method of attracting a target is provided. In some embodiments, the method comprises the step of placing a solid composition in an area where the target may be present. The previously described embodiments of the solid composition are applicable to the method of attracting a target described herein. In some embodiments, the method further comprises containing the solid composition in a delivery device. The previously described embodiments of the delivery device are applicable to the method of attracting a target described herein.

In some embodiments, the target is an insect. In some embodiments, the insect is selected from the group consisting of a mosquito, a psyllidae, and a beetle. In some embodiments, the insect is a mosquito. In some embodiments, the insect is a psyllidae. In some embodiments, the insect is a beetle. In some embodiments, the beetle is a pine beetle.

In some embodiments, the target is an arachnid. In some embodiments, the target is a rodent. In some embodiments, the target is a reptile. In some embodiments, the reptile is a snake. In some embodiments, the target is a scorpion. In some embodiments, the target is a mammal. In some embodiments, the mammal is a deer. In some embodiments, the mammal is a bat.

In any embodiments described herein, the following substitution of transition phrases are contemplated and are non-limiting. The transition phrases "comprise," "comprises," or "comprising" can be substituted with the transition phrases "consist of," "consists of," or "consisting of," respectively. Furthermore, in any embodiments described herein, the transition phrases "comprise," "comprises," or "comprising" can be substituted with the transition phrases "consist essentially of," "consists essentially of," or "consisting essentially of," respectively.

Example 1

Preparation of Solid Compositions

The solid compositions comprise a sorbent and an active composition. In this example, the solid compositions can be prepared from various wax sorbents and various active compositions.

First, an amount of wax is measured and then heated in a ventilated hood. The heating temperature of the wax is raised in order to melt the wax. For instance, the wax can be heated to a temperature at about 20° F. greater than the melting temperature of the wax.

Thereafter, an amount of active composition in liquid state is combined to the heated wax and stirred. The temperature is maintained at about 20° F. greater than the melting temperature of the wax to ensure through mixing of the wax and the liquid active composition, for instance about 20 seconds.

The liquid mixture of wax and active composition can then be poured into a mold of desired shape and size. In the instant example, an ice cube tray was utilized as the mold.

Solidification of the mixture into a solid composition can be achieved in the ventilated hood and then sealed from the surrounding air to minimize immediate volatilization of the active composition. Thereafter, the solid composition can be cooled overnight for further solidification, for instance in a refrigerator. FIG. 1A and FIG. 1B show the solid compositions in the molds after solidification. After cooling overnight, the solid compositions were easily removable from the molds. Thereafter, the solid compositions can be retained in the shape of the mold or can be segmented into smaller components, as shown in FIG. 2.

Weights of the compositions were taken at each step of the preparation process. There was essentially no loss of material at any step of the melting or solidification process.

Solid Compositions Formed from Paraffin Wax

Solid composition were formed using paraffin wax as the sorbent and various concentrations of garlic oil as the active composition. The solid compositions were formed using the protocol of the instant example. Table 1 shows the heating temperatures utilized for paraffin wax-containing solid compositions.

TABLE 1

| Solid Composition | Heating Temperature |
| --- | --- |
| Paraffin Wax Control (0% garlic oil) | 138° F. |
| Paraffin Wax with 22% garlic oil | 128° F. |
| Paraffin Wax with 45% garlic oil | 121° F. |

* stated % is in weight percentages

Solid Compositions Formed from Microcrystalline Wax

Solid composition were formed using microcrystalline wax as the sorbent and various concentrations of garlic oil, orange oil, lemongrass oil, peppermint oil, and lavender oil as the active composition. The solid compositions were formed using the protocol of the instant example. Table 2 shows the heating temperatures utilized for microcrystalline wax-containing solid compositions with garlic oil.

TABLE 2

| Solid Composition | Heating Temperature |
| --- | --- |
| Microcrystalline Wax Control (0% garlic oil) | 159° F. |
| Microcrystalline Wax with 22% garlic oil | 150° F. |
| Microcrystalline Wax with 41% garlic oil | 147° F. |
| Microcrystalline Wax with 44% garlic oil | 145° F. |
| Microcrystalline Wax with 50% garlic oil | 144° F. |
| Microcrystalline Wax with 60% garlic oil | 142° F. |

* stated % is in weight percentages

Table 3 shows the heating temperatures utilized for microcrystalline wax-containing solid compositions with orange oil, lemongrass oil, peppermint oil, and lavender oil.

TABLE 3

| Solid Composition | Heating Temperature |
| --- | --- |
| Microcrystalline Wax Control (0% oil) | 160° F. |
| Microcrystalline Wax with 47% orange oil | 135° F. |
| Microcrystalline Wax with 60% orange oil | 127° F. |
| Microcrystalline Wax with 41% lemongrass oil | 149° F. |
| Microcrystalline Wax with 51% lemongrass oil | 148° F. |
| Microcrystalline Wax with 60% lemongrass oil | 146° F. |
| Microcrystalline Wax with 40% peppermint oil | 146° F. |
| Microcrystalline Wax with 50% peppermint oil | 144° F. |
| Microcrystalline Wax with 59% peppermint oil | 141° F. |
| Microcrystalline Wax with 40% lavender oil | 148° F. |
| Microcrystalline Wax with 51% lavender oil | 146° F. |
| Microcrystalline Wax with 60% lavender oil | 144° F. |

* stated % is in weight percentages

Example 2

Preparation of Solid Compositions with Containers

The solid compositions were also prepared and placed into a container. The solid compositions were prepared as described in Example 1.

Thereafter, a container is selected for this embodiment. The solid composition is segmented into smaller components and the smaller components are placed into the container. For example, the segmentation can be performed using a grater to make filings of the solid composition.

After the solid compositions are placed into the container, a lid can be placed on the container and one or more apertures can be made in the lid. FIGS. 3A and 3B show examples of the solid compositions with containers.

Example 3

Evaluation and Efficacy of Solid Compositions

The solid compositions can be evaluated over a duration of time to determine their effectiveness, including periods of up to 300 days (or more). The change in weight over time of the solid compositions can be utilized for this purpose.

Generally, there was substantially no weight loss of sorbent from the solid compositions over time. Accordingly, without being bound by any theory, it is believed that the weight loss of the solid compositions is due to release of the active composition from the solid composition via volatilization of the active composition. Thus, if a solid composition continues to lose weight over a period of time, this is indicative of release of the active composition from the solid composition over the time period.

An average emission rate of about 20 mg per day of active composition is a target value for controlled emission of active ingredient in a pest-repellant or a pest-attractant formulation. As described in the instant example, the solid compositions of the present disclosure can provide this level of average emission rate and thus provide sufficient controlled emission of active composition. In particular, the solid compositions of the present disclosure can unexpectedly provide a long term, controlled emission of active composition for longer periods of time (e.g., 100 days, 200 days, 300 days, 400 days, 500 days, and longer).

Figure 4:
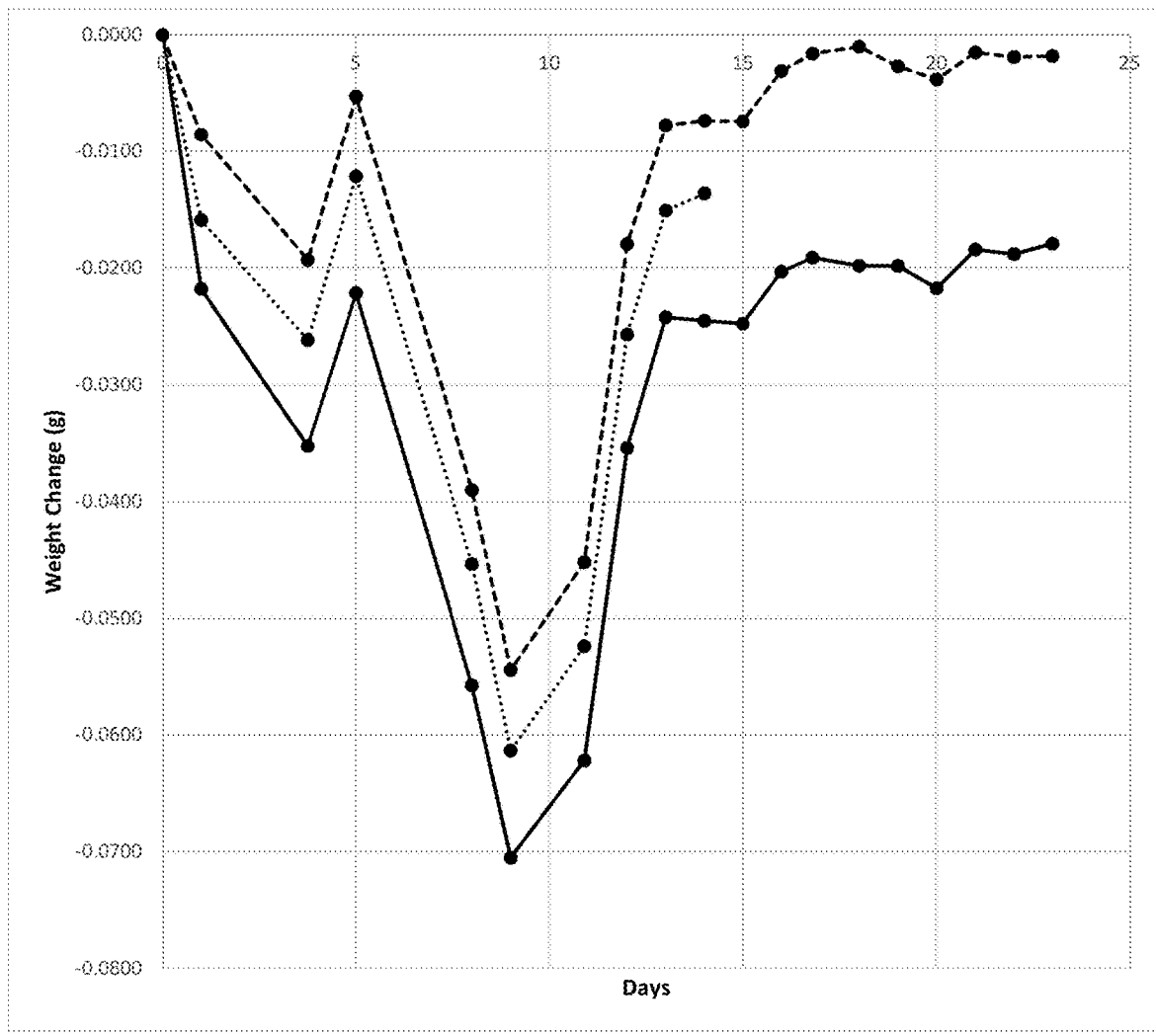
FIG. 4 shows the change in weight over 25 days for control samples formulated with paraffin wax and 0% active composition. Change in weight (grams) is shown on the y-axis and number of days is shown on the x-axis. The change in weight over 25 days of three solid compositions comprising unmelted paraffin wax with 0% active composition is shown. The "V-shaped" dip between about days 5-10 is likely due to humidity changes and was relatively small (i.e., −0.07 grams).
Figure 5:
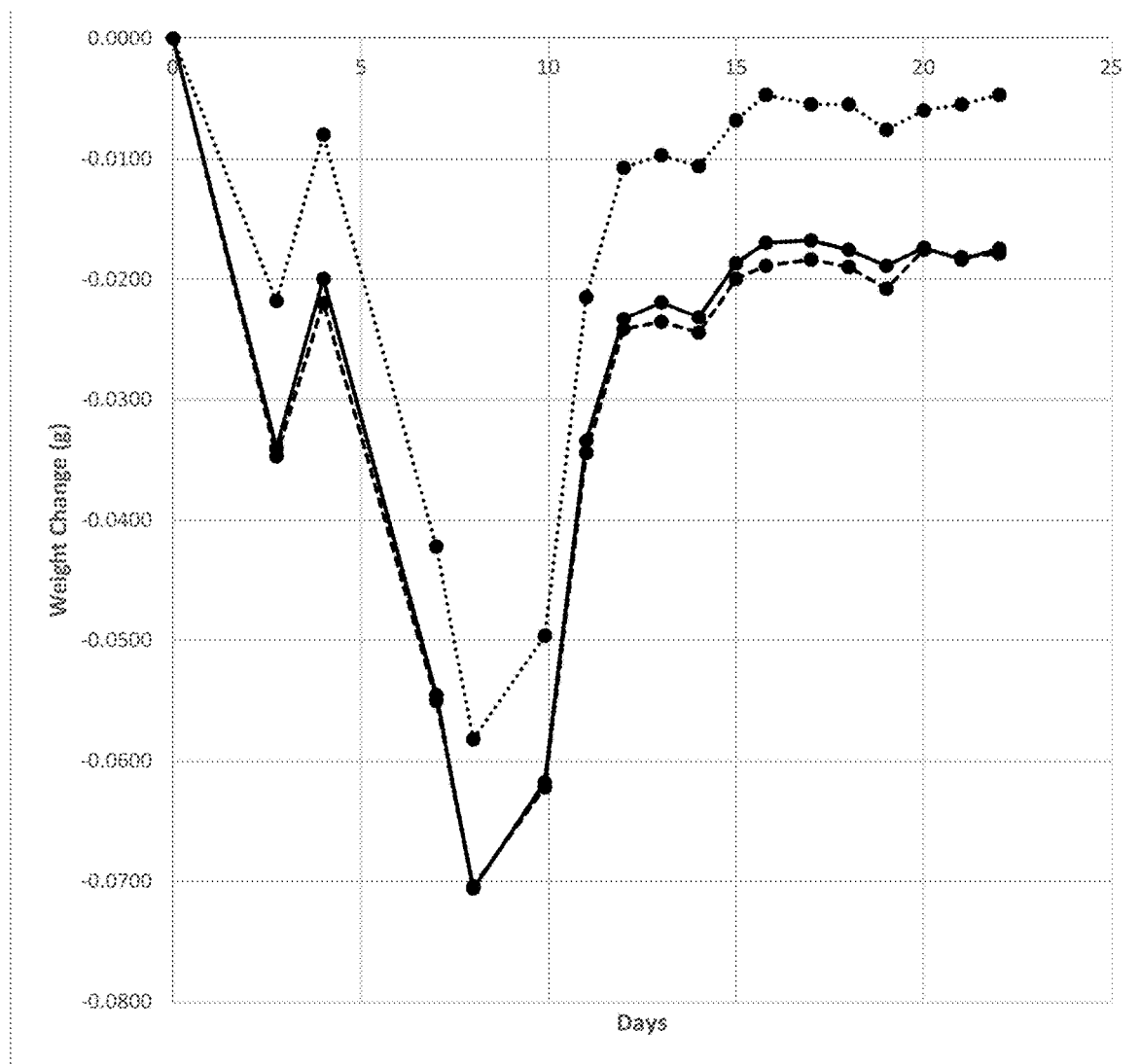
FIG. 5 shows the change in weight over 25 days for control samples formulated with paraffin wax and 0% active composition. Change in weight (grams) is shown on the y-axis and number of days is shown on the x-axis. The change in weight over 25 days of three solid compositions comprising melted paraffin wax with 0% active composition is shown. The "V-shaped" dip between about days 5-10 is likely due to humidity changes and was relatively small (i.e., −0.07 grams).

In the instant example, various embodiments of the present disclosure were evaluated to determine the weight loss of active composition from the solid composition over time. In particular, the following variables were evaluated:

Sorbents:
  Paraffin wax, microcrystalline wax
Active Compositions:
  Garlic oil
Percentage (weight) of Active Composition in the Solid Composition:
  0%, 10%, 25%, 45%, 50%
Solid Composition Form
  Flakes, larger sized ("chunk") solid
Environment of Exposure of Solid Composition:
  Ventilated hood, sun-exposed outdoor environment, shaded outdoor environment A. Control solid composition samples were formulated with paraffin wax and 0% active composition. The solid compositions were evaluated over a 25 day period to determine their change in weight. As shown in FIG. 4, solid compositions comprising unmelted paraffin wax and 0% active composition demonstrated little change in weight from day 1 to day 25. This result indicates that a solid composition comprising wax and no active composition maintains a steady weight over time. Likewise, FIG. 5 shows that solid compositions comprising melted paraffin wax and 0% active composition demonstrated little change in weight from day 1 to day 25. The "V-shaped" dip between about days 5-10 is likely due to humidity changes and was relatively small in nature (i.e., −0.07 grams).

Figure 6:
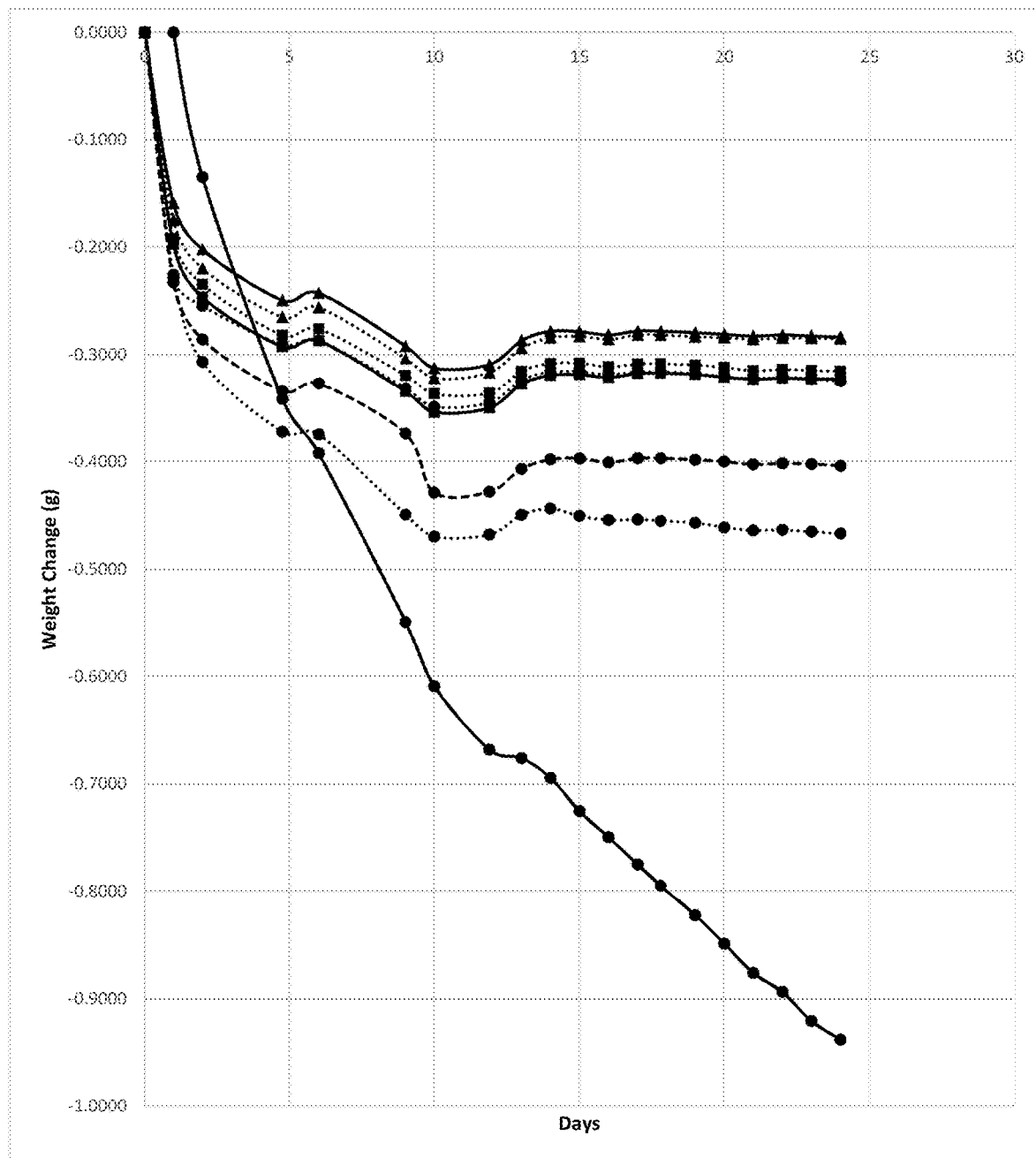
FIG. 6 shows the change in weight over 25 days for various sizes of solid compositions comprising paraffin wax and 10% garlic oil in open air. Change in weight (grams) is shown on the y-axis and number of days is shown on the x-axis. A lesser amount of weight loss was observed for smaller segmentations of solid compositions (e.g., very fine filings represented by the dashed or dotted lines) and a greater amount of weight loss was observed for larger sized solid composition (e.g., a "chunk" represented by the solid line).

B. Solid composition samples were formulated with paraffin wax and 10% garlic oil. The solid compositions of various sizes were evaluated over a 25 day period in open air to determine their change in weight. As shown in FIG. 6, the larger sized solid composition (e.g., a "chunk" represented by the solid line) demonstrated greater amount of weight loss from day 1 to day 25 as compared to smaller segmentations of solid composition (e.g., very fine filings represented by the dashed or dotted lines). In other words, the volatilization of active composition from the solid composition was faster in smaller segmentations of solid composition compared to larger sized solid compositions.

Figure 7:
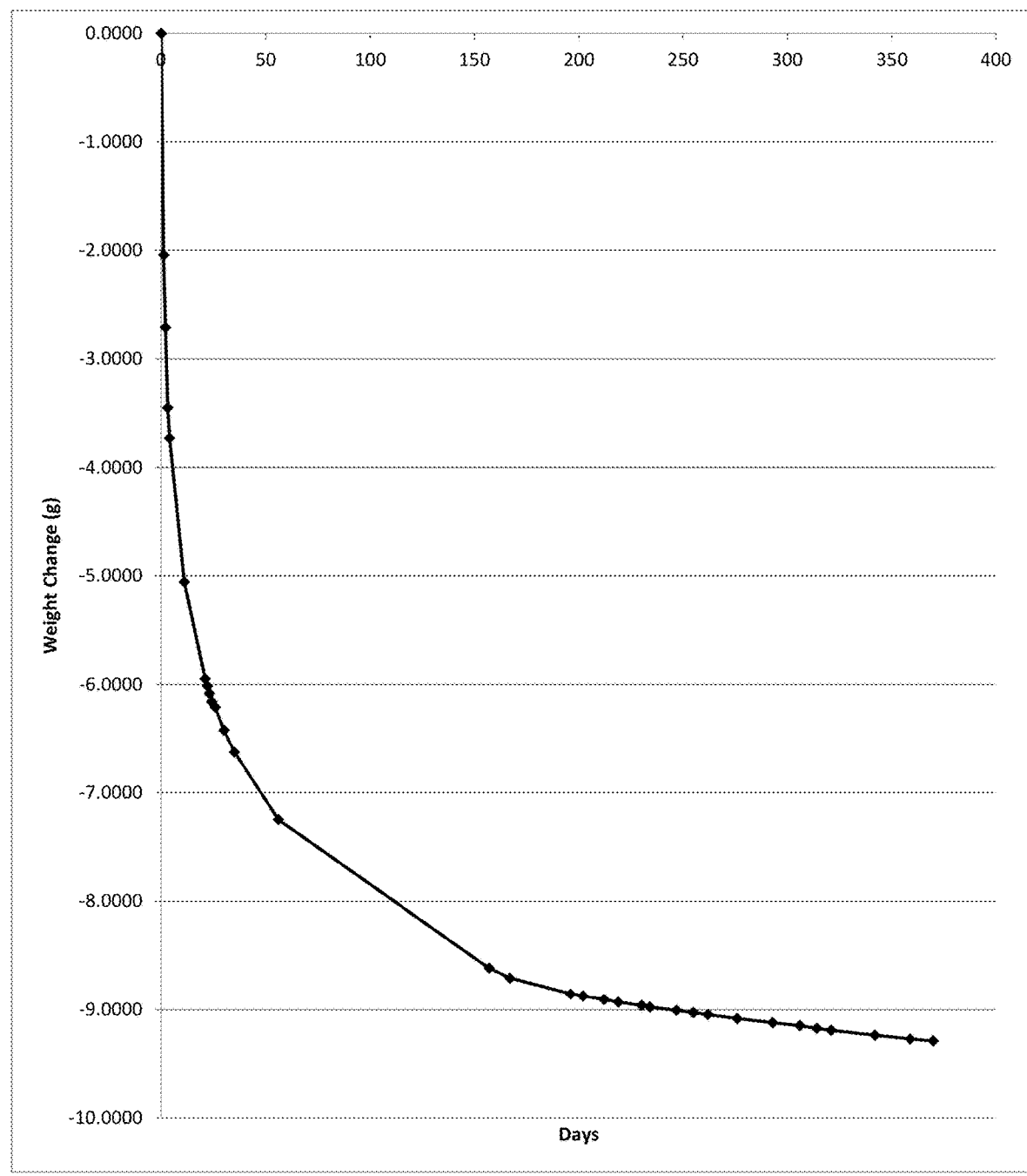
FIG. 7 shows the change in weight over about 400 days for solid compositions comprising microcrystalline wax and 50% garlic essential oil in a ventilation hood. Change in weight (grams) is shown on the y-axis and number of days is shown on the x-axis. The graph shows an average of 12 solid composition samples.

C. Solid composition samples were formulated with microcrystalline wax and 50% garlic essential oil. The solid compositions were evaluated over about a 400 day period in a ventilation hood to determine their change in weight. FIG. 7 shows average weight loss of 12 solid composition samples. As shown in FIG. 7, the solid compositions continued to lose weight over a period of almost 400 days. Since wax-only solid compositions did not lose weight over time, the weight loss shown in FIG. 7 indicates that garlic essential oil was continually released from the solid composition over the 400-day period via volatilization.

Figure 8:
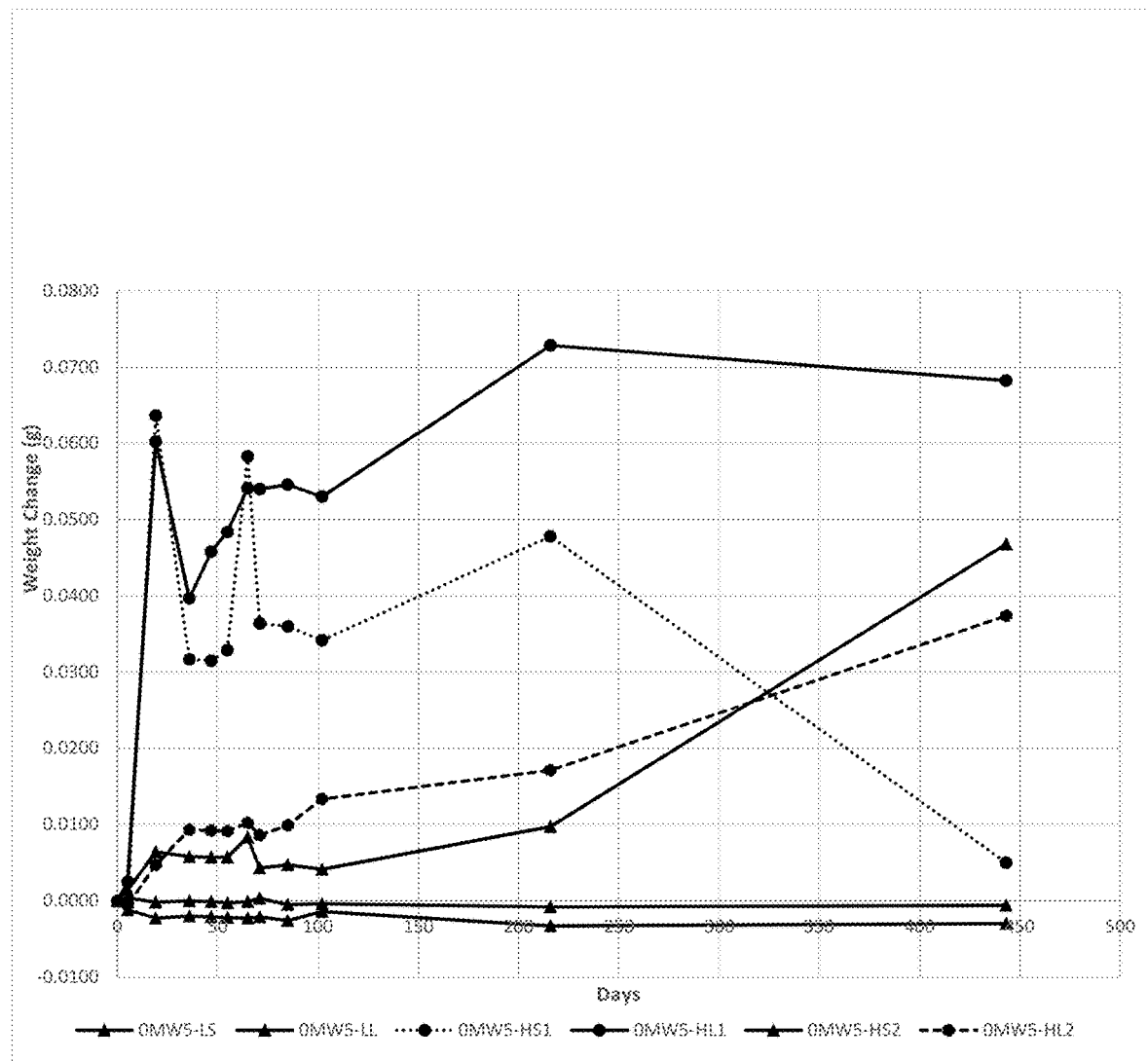
FIG. 8 shows the change in weight over 440 days for control samples formulated with microcrystalline wax and 0% active composition. Change in weight (grams) is shown on the y-axis and number of days is shown on the x-axis. Tests were performed in a laboratory fume hood, external conditions heated by sunlight, and external conditions in shade (non-sunlight).

D. Control solid composition samples were formulated with microcrystalline wax and 0% active composition. The solid compositions were evaluated over a 215 day period to determine their change in weight. Tests were performed in a laboratory fume hood, external conditions heated by sunlight, and external conditions in shade (non-sunlight). As shown in FIG. 8, solid compositions comprising microcrystalline wax and 0% active composition demonstrated little change in weight from day 1 to day 215. This result indicates that a solid composition comprising wax and no active composition maintains a steady weight over time, regardless of the conditions in which the solid composition was evaluated.

Figure 9:
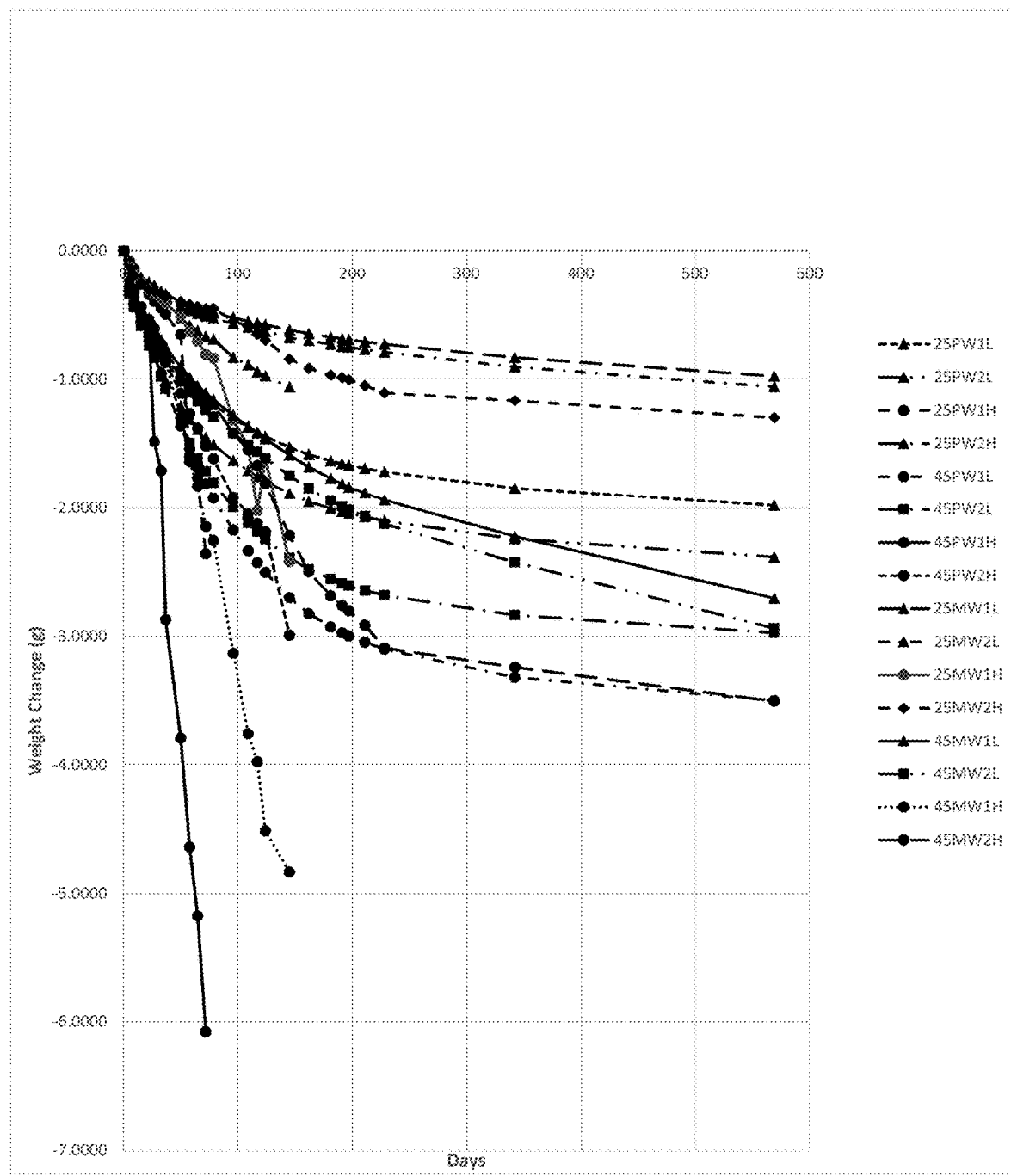
FIG. 9 shows the change in weight over about 560 days for solid compositions comprising paraffin wax or microcrystalline wax and 45% garlic oil. Change in weight (grams) is shown on the y-axis and number of days is shown on the x-axis. Tests were performed in a laboratory fume hood, external conditions heated by sunlight, and external conditions in shade (non-sunlight).

E. Solid composition samples were formulated with paraffin wax or microcrystalline wax and 45% garlic oil. The solid compositions were evaluated over a 440 day period to determine their change in weight. Tests were performed in a laboratory fume hood, external conditions heated by sunlight, and external conditions in shade (non-sunlight). As shown in FIG. 9, the solid compositions continued to lose weight over a period of over 440 days. Since wax-only solid compositions did not lose weight over time, the weight loss shown in FIG. 9 indicates that the garlic oil was continually released from the solid composition over the 440-day period via volatilization.

Figure 10:
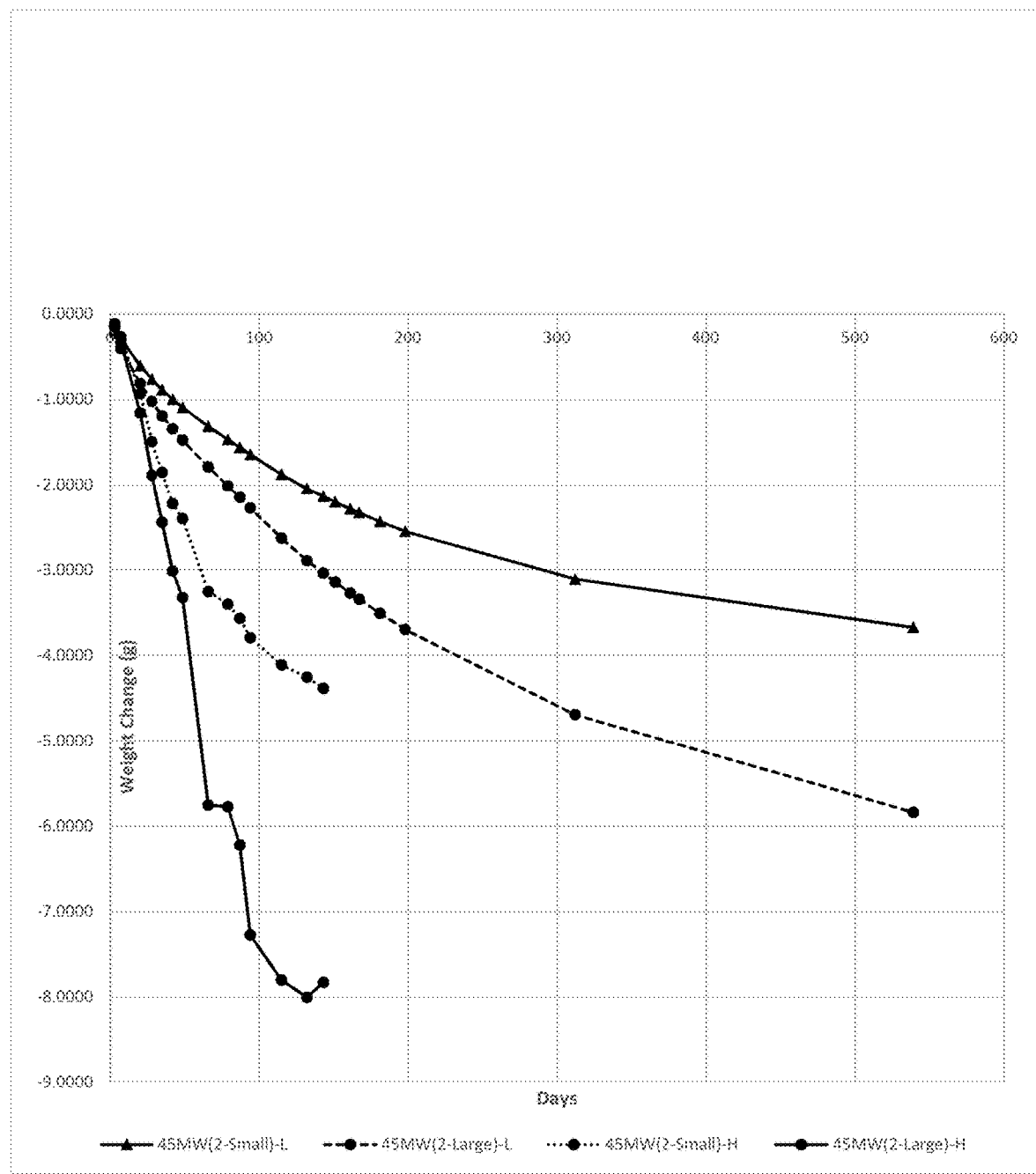
FIG. 10 shows the change in weight over about 540 days for solid compositions comprising microcrystalline wax and 45% garlic oil. Change in weight (grams) is shown on the y-axis and number of days is shown on the x-axis. Tests were performed in a laboratory fume hood and external conditions heated by sunlight.

F. Solid composition samples were formulated with microcrystalline wax and 45% garlic oil. The solid compositions were evaluated over a 560 day period in a laboratory fume hood or in external conditions heated by sunlight. As shown in FIG. 10, the solid compositions continued to lose weight over a period of over 560 days. The larger pieces of solid composition experienced more weight loss than the smaller pieces. Further, the solid compositions evaluated in the laboratory experienced more weight loss than the solid compositions evaluated in hot external conditions. Since wax-only solid compositions did not lose weight over time, the weight loss shown in FIG. 10 indicates that the garlic oil was continually released from the solid composition over the 560-day period via volatilization.

Figure 11:
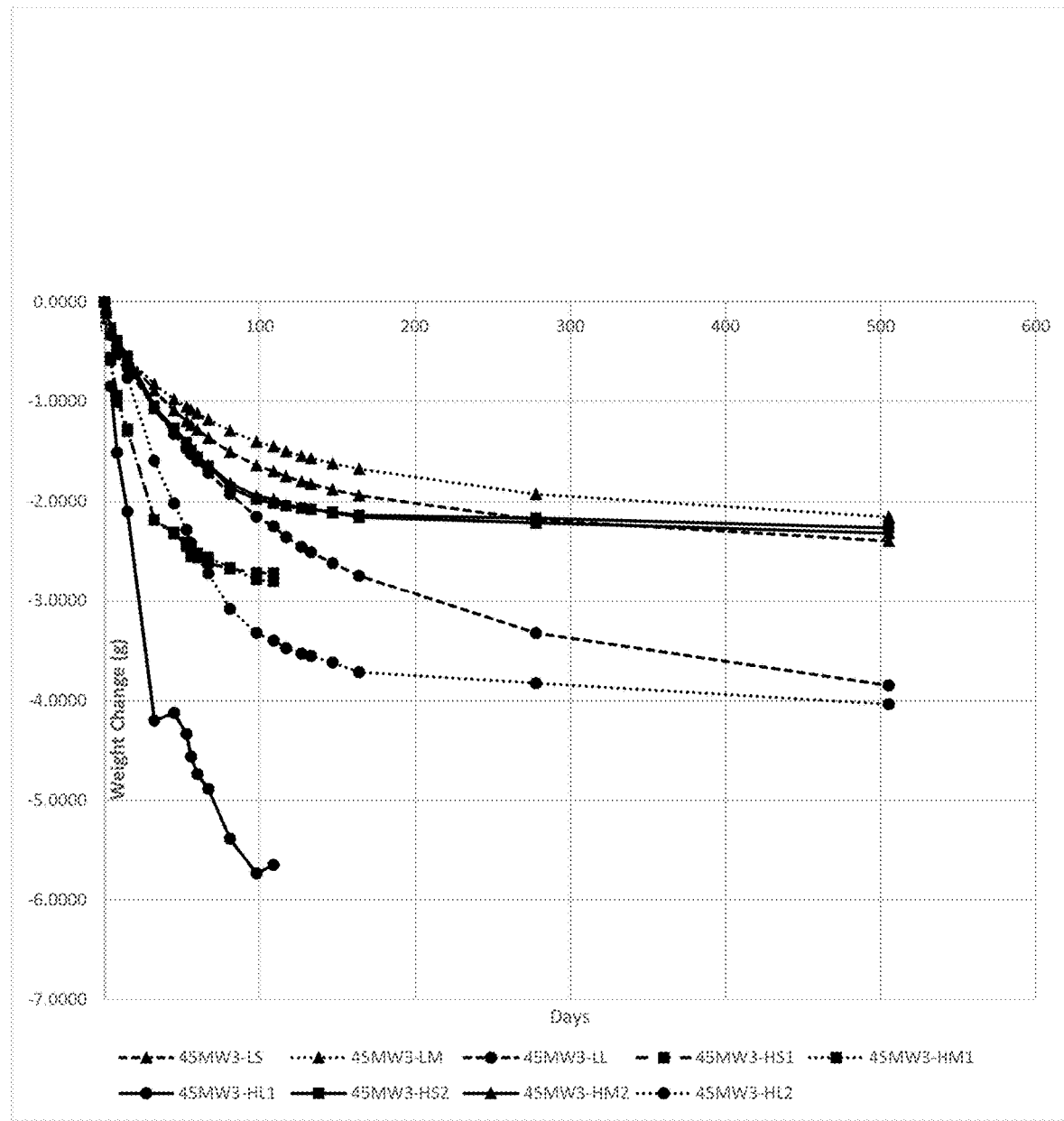
FIG. 11 shows the change in weight over about 500 days for solid compositions comprising microcrystalline wax and 45% garlic oil. Change in weight (grams) is shown on the y-axis and number of days is shown on the x-axis. Tests were performed in a laboratory fume hood, external conditions heated by sunlight, and external conditions in shade (non-sunlight).

G. Solid composition samples were formulated with microcrystalline wax and 45% garlic oil. The solid compositions were evaluated over a 540 day period to determine their change in weight. Tests were performed in a laboratory fume hood, external conditions heated by sunlight, and external conditions in shade (non-sunlight). As shown in FIG. 11, the solid compositions continued to lose weight over a period of over 540 days. Since wax-only solid compositions did not lose weight over time, the weight loss shown in FIG. 11 indicates that the garlic oil was continually released from the solid composition over the 540-day period via volatilization.

Figure 12:
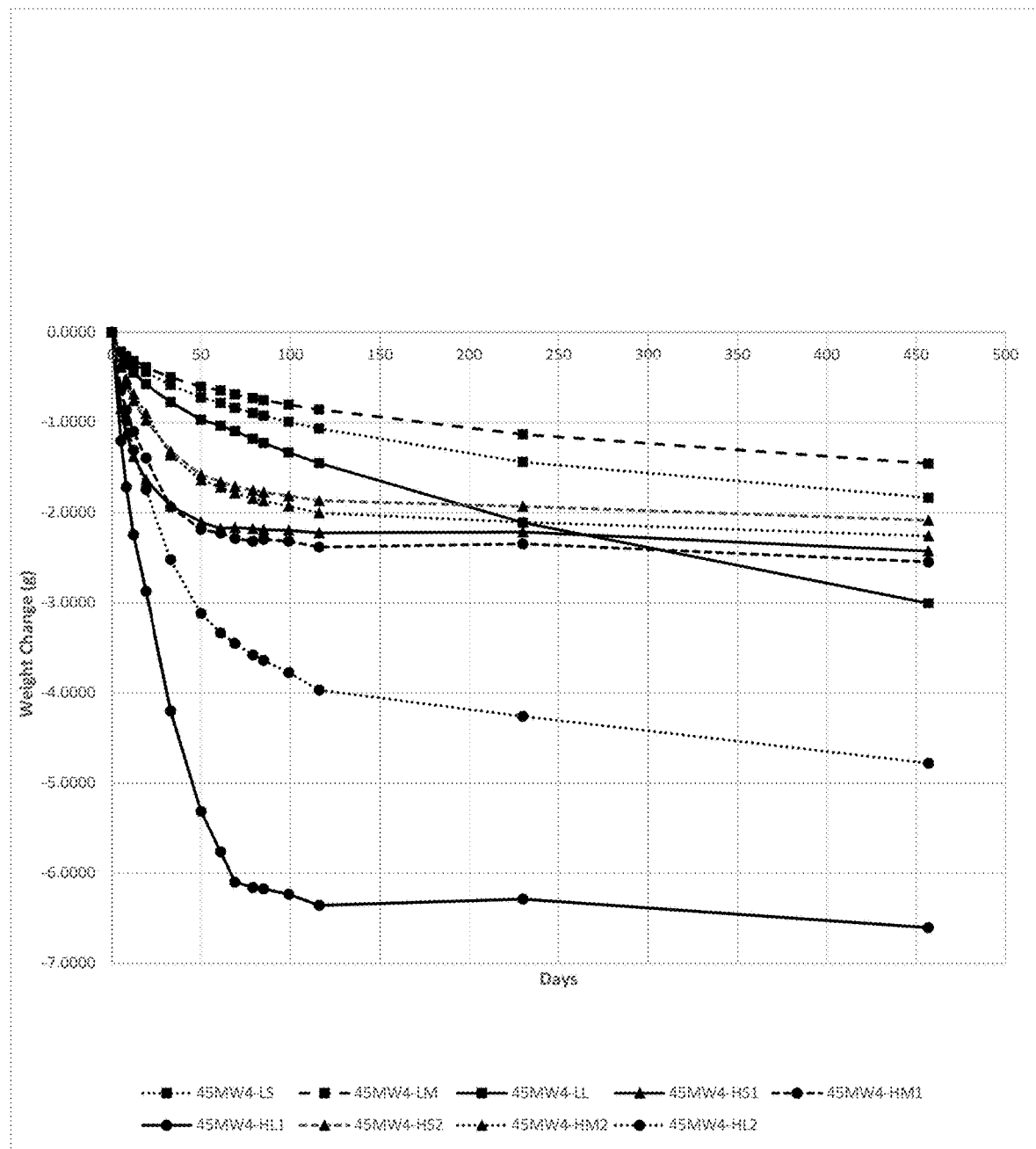
FIG. 12 shows the change in weight over about 455 days for solid compositions comprising microcrystalline wax and 45% garlic oil. Change in weight (grams) is shown on the y-axis and number of days is shown on the x-axis. Tests were performed in a laboratory fume hood, external conditions heated by sunlight, and external conditions in shade (non-sunlight).

H. Solid composition samples were formulated with microcrystalline wax and 45% garlic oil. The solid compositions were evaluated over a 540 day period to determine their change in weight. Tests were performed in a laboratory fume hood, external conditions heated by sunlight, and external conditions in shade (non-sunlight). As shown in FIG. 12, the solid compositions continued to lose weight over a period of over about 540 days. Since wax-only solid compositions did not lose weight over time, the weight loss shown in FIG. 12 indicates that the garlic oil was continually released from the solid composition over the 540-day period via volatilization.

Figure 13:
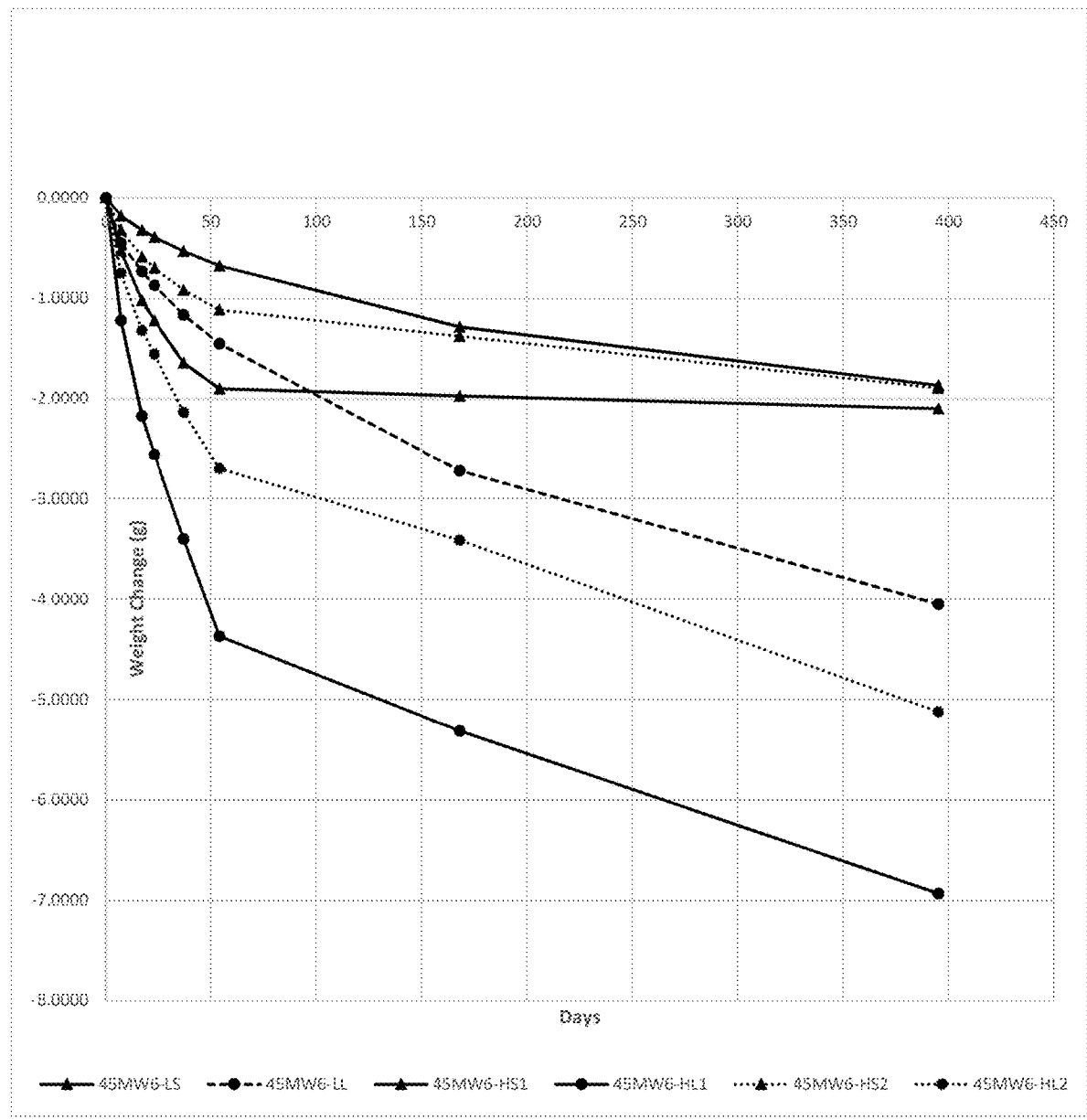
FIG. 13 shows the change in weight over about 390 days for solid compositions comprising microcrystalline wax and 45% garlic oil. Change in weight (grams) is shown on the y-axis and number of days is shown on the x-axis. Tests were performed in a laboratory fume hood, external conditions heated by sunlight, and external conditions in shade (non-sunlight).

I. Solid composition samples were formulated with microcrystalline wax and 45% garlic oil. The solid compositions were evaluated over a 390 day period to determine their change in weight. Tests were performed in a laboratory fume hood, external conditions heated by sunlight, and external conditions in shade (non-sunlight). As shown in FIG. 13, the solid compositions continued to lose weight over a period of over about 390 days. Since wax-only solid compositions did not lose weight over time, the weight loss shown in FIG. 13 indicates that the garlic oil was continually released from the solid composition over the 390-day period via volatilization.

Example 4

Evaluation and Efficacy of Solid Compositions with Containers

Similar to the procedure of Example 3, solid compositions with containers can be evaluated over a duration of time to determine their effectiveness, including periods of up to 300 days (or more). The change in weight over time of the solid compositions with containers can be utilized for this purpose.

Generally, there was substantially no weight loss of sorbent from the solid compositions over time. Accordingly, without being bound by any theory, it is believed that the weight loss of the solid compositions is due to release of the active composition from the solid composition via volatilization of the active composition.

An average emission rate of about 20 mg per day of active composition is a target value for controlled emission of active ingredient in a pest-repellant or a pest-attractant formulation. As described in the instant example, the solid compositions of the present disclosure can provide this level of average emission rate and thus provide sufficient controlled emission of active composition. In particular, the solid compositions of the present disclosure can unexpectedly provide a long term, controlled emission of active composition for longer periods of time (e.g., 100 days, 200 days, 300 days, 400 days, 500 days, and longer).

Figure 14A:
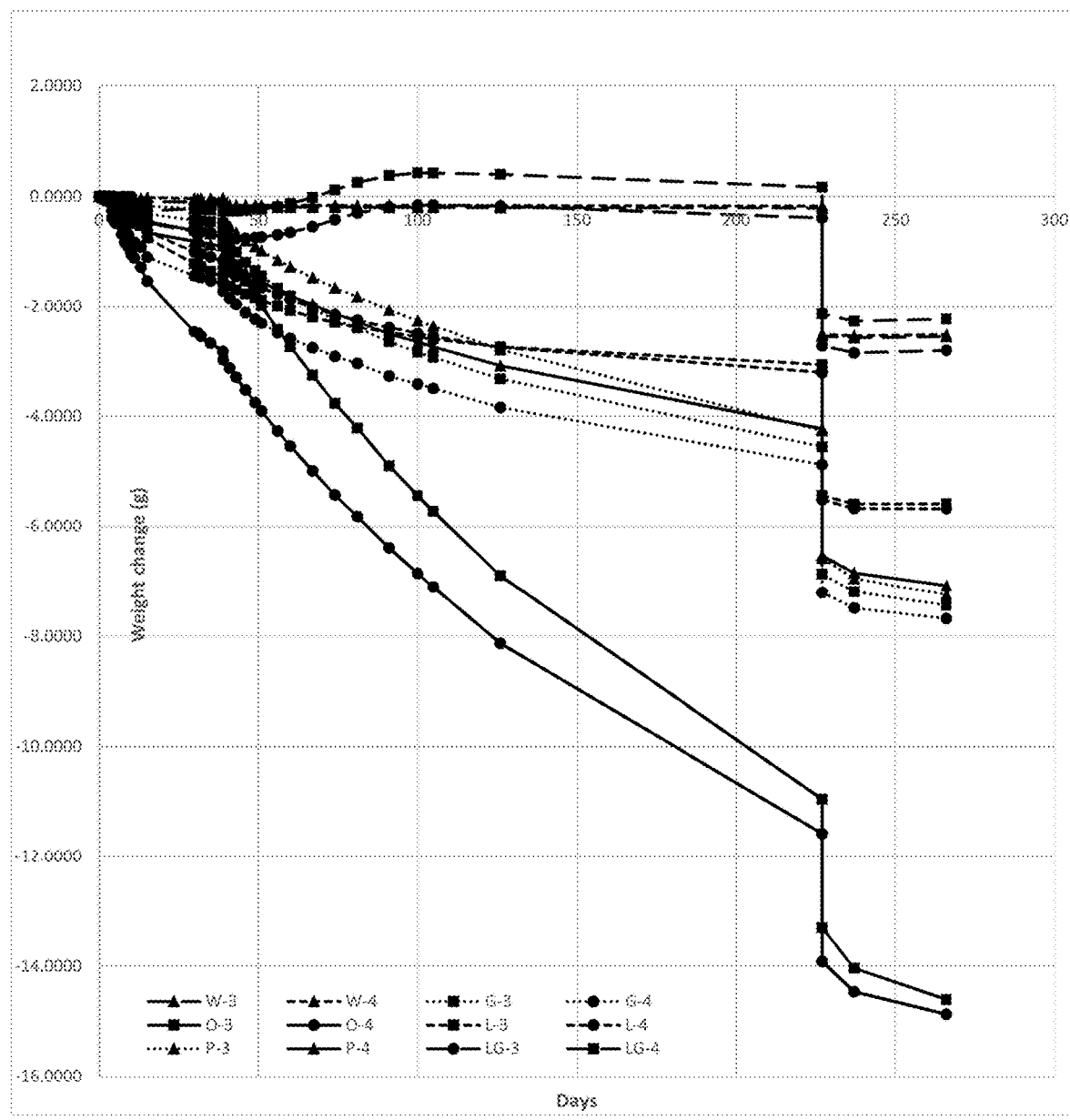
FIGS. 14A and 14B show the change in weight over about 275 days for solid compositions comprising microcrystalline wax and 45% of various oils (garlic, peppermint, lavender, lemongrass, and orange) with containers.
Figure 14B:
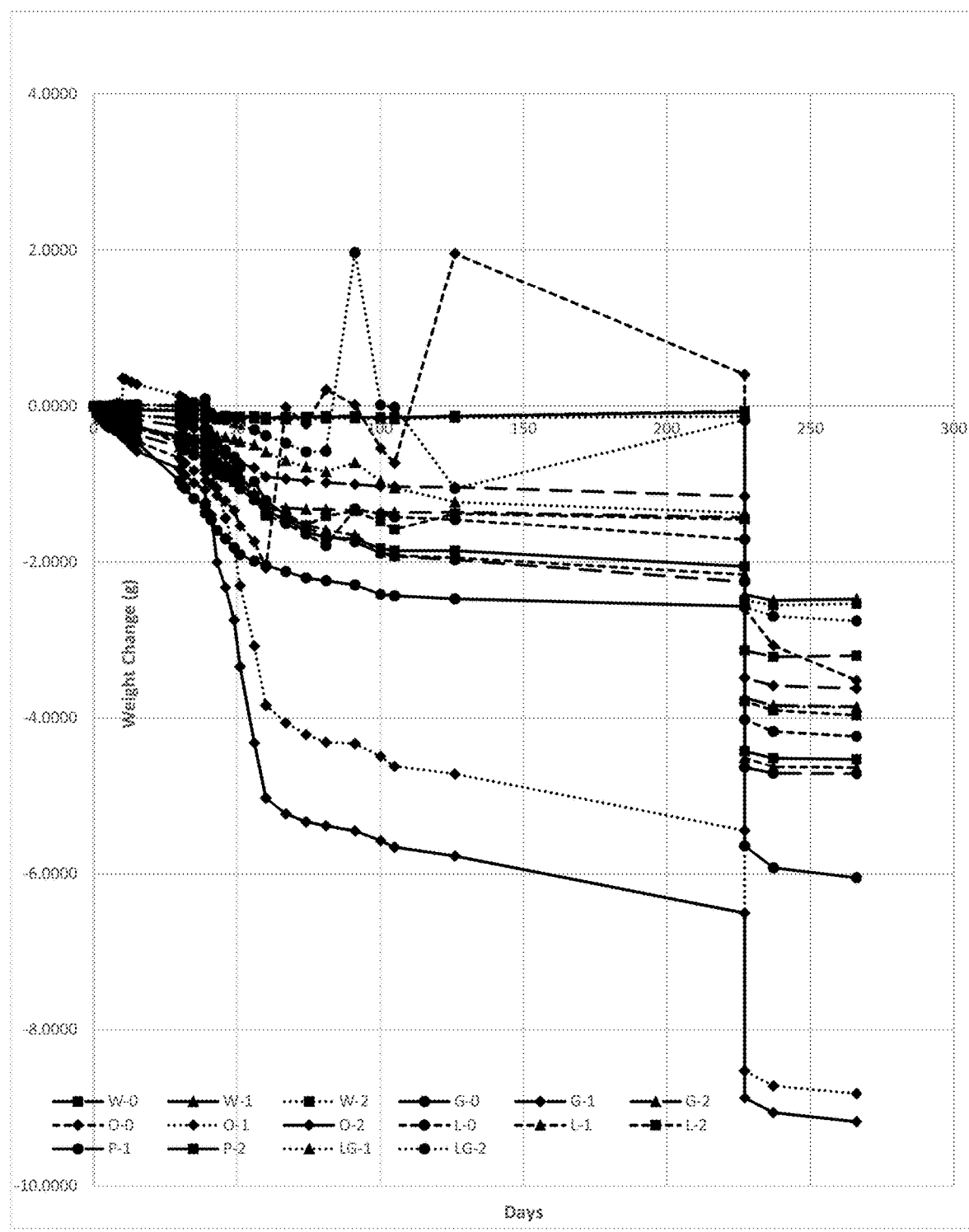

In the instant example, various embodiments of the present disclosure were evaluated to determine the weight loss of active composition from the solid compositions with containers over time. In particular, the following variables were evaluated:

Sorbents:
    Paraffin wax, microcrystalline wax, foam, cotton ball, cotton fabric, cotton fabric/foam
Active Compositions:
    Garlic oil, garlic oil blend, peppermint oil, lavender oil, lemongrass oil, orange oil
Percentage (weight) of Active Composition in the Solid Composition:
    0%, 10%, 33%, 45%, 50%
Solid Composition Form
    Flakes, larger sized ("chunk") solid
Environment of Exposure of Solid Composition:
    Ventilated hood, sun-exposed outdoor environment, shaded outdoor environment
Apertures
    Number of apertures, size of apertures A. Solid composition samples were formulated with microcrystalline wax and 45% of various oils (garlic, peppermint, lavender, lemongrass, and orange). The solid compositions were placed in containers, with the containers utilizing two $5/64$" holes as apertures. The solid compositions were evaluated over a 275 day period in a lab setting and in an external setting to determine their change in weight. As shown in FIG. 14A and FIG. 14B, the solid compositions continued to lose weight over a period of almost 275 days. FIG. 14A presents tests performed under laboratory conditions and FIG. 14B presents tests performed in an external setting. Since wax-only solid compositions did not lose weight over time, the weight loss shown in FIG. 14A and FIG. 14B indicates that various oils were continually released from the solid composition over the 275-day period via volatilization. The abrupt changes in weight at around day 225 is due to removal of the lid from the containers, which was independent of the release of active composition from the solid composition.

Figure 15:
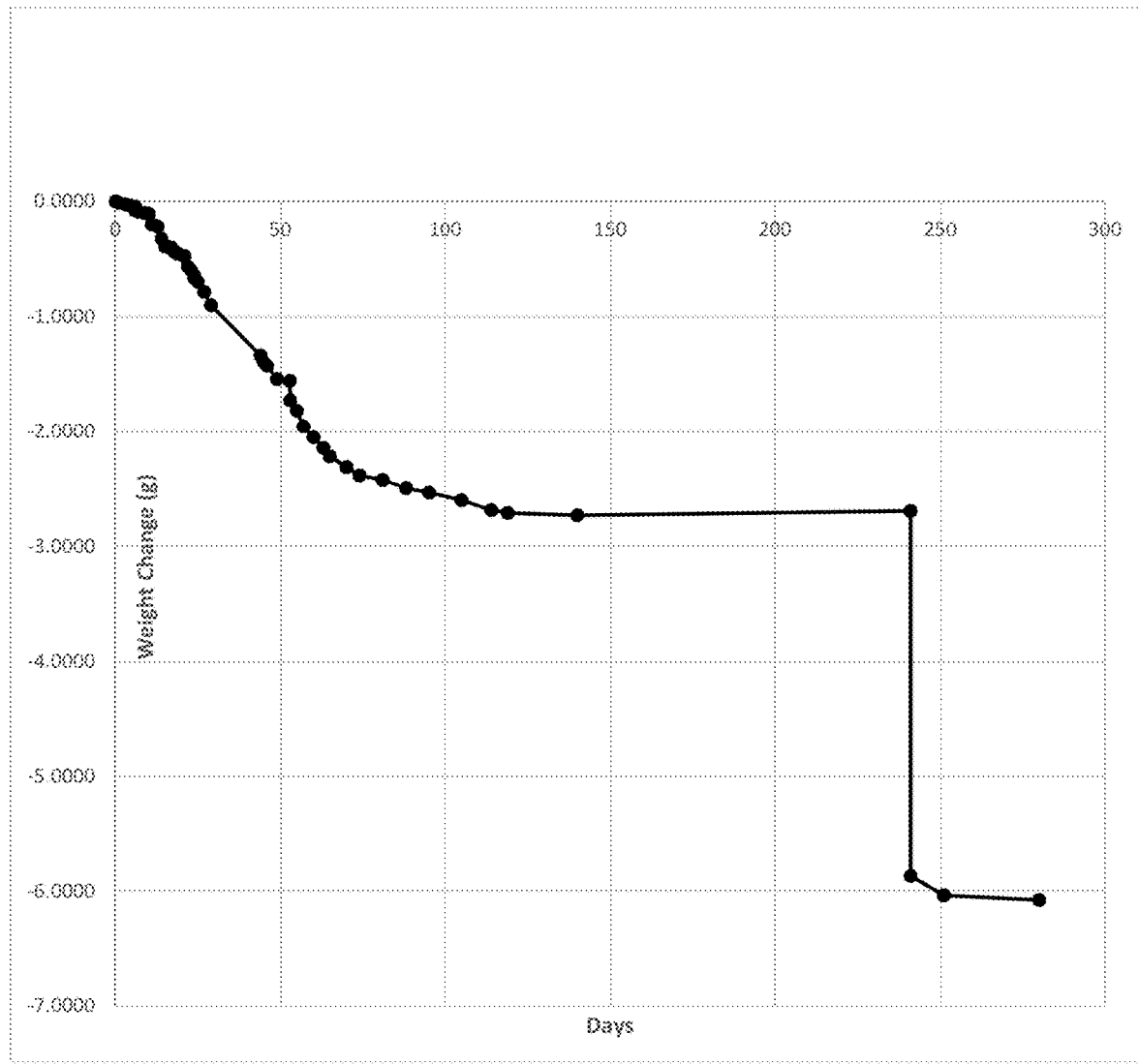
FIG. 15 shows the change in weight over about 275 days for solid compositions comprising microcrystalline wax and 45% garlic oil with containers. Change in weight (grams) is shown on the y-axis and number of days is shown on the x-axis. All containers utilized one 9/64" hole on the side of the container as an aperture. The abrupt changes in weight at around day 240 is due to removal of the lid from the container, which was independent of the release of active composition from the solid composition.

B. Solid composition samples were formulated with microcrystalline wax and 45% of garlic oil. The solid compositions were placed in containers, with the containers utilizing one $5/64$" hole on the side of the container as an aperture. The solid compositions were evaluated over a 275 day period to determine their change in weight. As shown in FIG. 15, the solid compositions continued to lose weight over a period of almost 150 days. Since wax-only solid compositions did not lose weight over time, the weight loss shown in FIG. 15 indicates that various oils were continually released from the solid composition over a 150-day period via volatilization. The abrupt changes in weight at around day 240 is due to removal of the lid from the containers, which was independent of the release of active composition from the solid composition.

Figure 16:
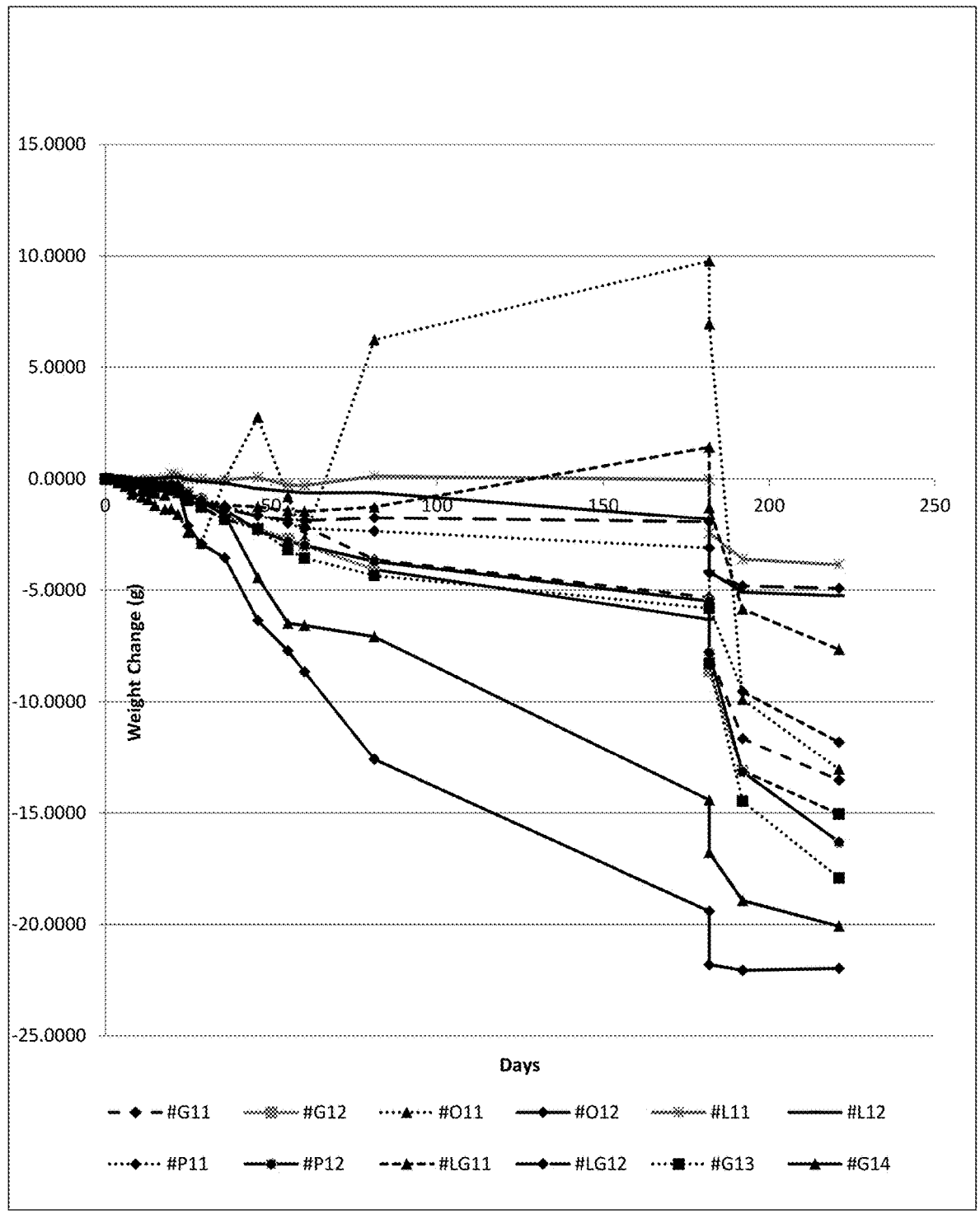
FIG. 16 shows the change in weight over about 225 days for solid compositions comprising foam and cotton and various oils (garlic, peppermint, lavender, lemongrass, and orange) with containers. Change in weight (grams) is shown on the y-axis and number of days is shown on the x-axis. The abrupt changes in weight at around day 175 is due to removal of the lid from the containers, which was independent of the release of active composition from the solid composition.

C. Solid composition samples were formulated with foam and cotton and various oils (garlic, peppermint, lavender, lemongrass, and orange). The solid compositions were placed in containers. The solid compositions were evaluated over a 225 day period to determine their change in weight. As shown in FIG. 16, foam and cotton are viable options for release of volatile compositions. The abrupt changes in weight at around day 175 is due to removal of the lid from the containers, which was independent of the release of active composition from the solid composition.

Figure 17:
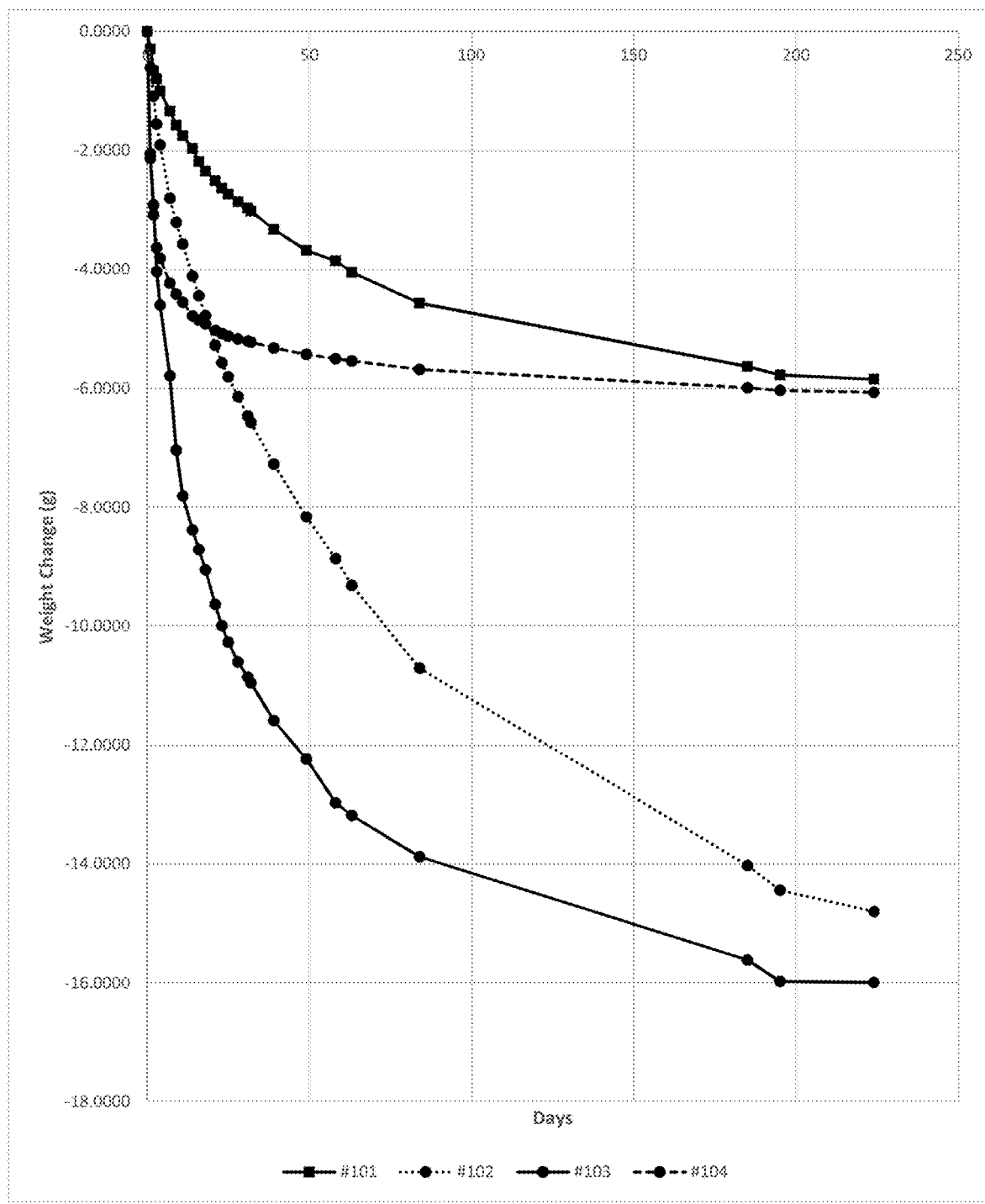
FIG. 17 shows the change in weight over about 225 days for solid compositions comprising various sorbents (sponge, foam, cotton fabric, and cotton fabric/foam mixture) and garlic essential oil with containers. Change in weight (grams) is shown on the y-axis and number of days is shown on the x-axis.

D. Solid composition samples were formulated with various sorbents (sponge, foam, cotton fabric, and cotton fabric/foam mixture) and garlic essential oil. The solid compositions were placed in containers. The solid compositions were evaluated over a 225 day period to determine their change in weight. As shown in FIG. 17, sponge, foam, cotton fabric, and cotton fabric/foam mixture are viable options for release of volatile compositions.

Figure 18:
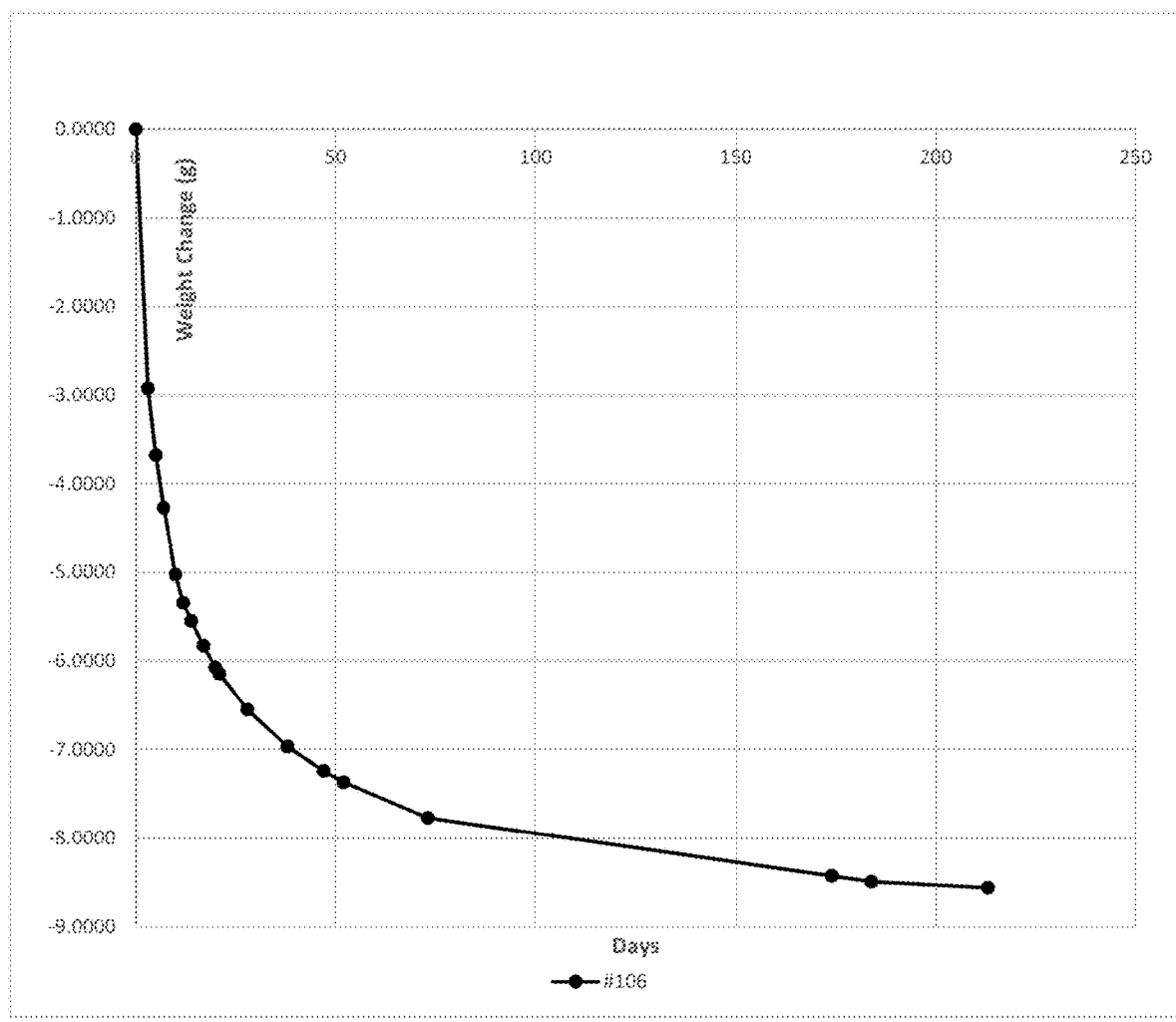
FIG. 18 shows the change in weight over about 215 days for solid compositions comprising cotton balls and garlic oil with containers. Change in weight (grams) is shown on the y-axis and number of days is shown on the x-axis.

E. Solid composition samples were formulated with cotton balls and garlic oil. The solid compositions were placed in containers. The solid compositions were evaluated over a 215 day period to determine their change in weight. As shown in FIG. 18, cotton balls are capable of releasing garlic oil in a controlled manner.

Example 5

Evaluation of Solid Compositions as Repellants

Embodiments comprising the solid compositions of the present disclosure can be utilized as compositions and methods to repel pests. For instance, the active composition of the solid composition can be a repellant composition and embodiments comprising such solid compositions can repel pests when placed in an area where the pests may be present.

One or more solid compositions comprising a repellant composition can be placed in an area to control the presence of undesired pests. For instance, a solid composition comprising a repellant composition that repels mosquitoes can be placed in an exterior environment (e.g., outside of a building) where presence of mosquitoes is undesirable. As garlic oil is known to repel mosquitos, solid compositions comprising garlic oil as the repellant composition can be used for this purpose.

Likewise, active compositions known to repel other pests can be used in a similar manner. For instance, pests such as arachnids, rodents, reptiles (e.g., snakes), scorpions, bats, and the like can be repelled by solid compositions of the present disclosure when such solid compositions comprise a repellant composition that repels the pest.

The solid compositions utilized in the instant example can be used with or without containers. In order to evaluate the efficacy of the solid compositions, the solid compositions can be evaluated over a duration of time, including periods of up to 300 days (or more). For instance, the change in weight over time of the solid compositions can be evaluated. Furthermore, the number, frequency, and general presence of the pest in the area to be protected can also be evaluated over a duration of time, including periods of up to 300 days (or more).

Without being bound by any theory, the solid compositions of the instant example can undergo weight loss due to release of the repellant composition from the solid composition via volatilization of the repellant composition. This release can provide the desired repellant effects over a period of time which continue for long durations of time (e.g., up to 100 days, 200 days, 300 days, 400 days, 500 days, and longer). The repellant effect can be evaluated by measuring the weight loss of the solid compositions as described in the present disclosure.

Example 6

Evaluation of Solid Compositions as Attractants

Embodiments comprising the solid compositions of the present disclosure can be utilized as compositions and methods to attract targets. For instance, the active composition of the solid composition can be an attractant composition and embodiments comprising such solid compositions can attract targets when placed in an area where the targets may be present.

One or more solid compositions comprising an attractant composition can be placed in an area to control the presence of desired targets. For instance, a solid composition comprising an attractant composition that attracts moths can be placed an exterior environment (e.g., outside of a building) where presence of moths is desired. As various pheromones are known to attract moths, solid compositions comprising one or more pheromones as the attractant composition can be used for this purpose.

Likewise, active compositions known to attract other targets can be used in a similar manner. For instance, targets such as arachnids, rodents, reptiles (e.g., snakes), scorpions, bats, and the like can be attracted by solid compositions of the present disclosure when such solid compositions comprise an attractant composition that attracts the target.

The solid compositions utilized in the instant example can be used with or without containers. In order to evaluate the efficacy of the solid compositions, the solid compositions can be evaluated over a duration of time, including periods of up to 300 days (or more). For instance, the change in weight over time of the solid compositions can be evaluated. Furthermore, the number, frequency, and general presence of the target in the area of desired attraction can also be evaluated over a duration of time, including periods of up to 300 days (or more).

Without being bound by any theory, the solid compositions of the instant example can undergo weight loss due to release of the attractant composition from the solid composition via volatilization of the attractant composition. This release can provide the desired attractant effects over a period of time which continue for long durations of time (e.g., up to 100 days, 200 days, 300 days, 400 days, 500 days, and longer). The attractant effect can be evaluated by measuring the weight loss of the solid compositions as described in the present disclosure.

What is claimed is:

1. A method of repelling a pest, said method comprising the step of placing a solid composition comprising i) a sorbent and ii) an active composition in an area wherein the pest may be present, wherein the sorbent is a microcrystalline wax,
   wherein the solid composition comprises the active composition at a concentration from about 10% to about 50% by volume, and wherein the solid composition comprises the microcrystalline wax at a concentration of at least 50% by volume,
   wherein the solid composition is configured in a shape to control the release of the active composition from the solid composition, wherein the active composition comprises a volatile composition, and
   wherein the solid composition does not comprise a fibrous composition.

2. The method of claim 1, wherein the pest is an insect.

3. The method of claim 1, wherein the active composition is a garlic oil.

4. The method of claim 1, wherein the active composition comprises a volatile composition, and wherein the solid composition is capable of releasing the volatile composition for at least 100 days.

5. The method of claim 1, wherein the active composition comprises a volatile composition, and wherein the solid composition is capable of releasing the volatile composition for at least 300 days.

6. The method of claim 1, wherein the active compound comprises one or more pheromones.

7. The method of claim 1, wherein the pest is an inset selected from a mosquito, a psyllidae, a beetle, a moth, or a combination thereof.

8. The method of claim 1, wherein the solid composition comprises the active composition at a concentration from about 20% to about 50% by volume.

9. The method of claim 1, wherein the solid composition comprises the active composition at a concentration from about 30% to about 50% by volume.

10. The method of claim 1, wherein the solid composition comprises the active composition at a concentration from about 40% to about 50% by volume.

11. A method of repelling a pest, said method comprising the step of placing a solid composition comprising i) a sorbent and ii) an active composition in an area wherein the pest may be present, wherein the sorbent is a microcrystalline wax, wherein the solid composition comprises the microcrystalline wax at a concentration of at least 50% by volume,
    wherein the solid composition comprises the active composition at a concentration from about 30% to about 50% by volume, and
    wherein the solid composition does not comprise a fibrous composition.

12. The method of claim 11, wherein the pest is an insect.

13. The method of claim 11, wherein the solid composition is configured in a shape to control the release of the active composition from the solid composition, wherein the active composition comprises a volatile composition.

14. The method of claim 11, wherein the active composition is a garlic oil.

15. The method of claim 11, wherein the active composition comprises a volatile composition, and wherein the solid composition is capable of releasing the volatile composition for at least 100 days.

16. The method of claim 11, wherein the active composition comprises a volatile composition, and wherein the solid composition is capable of releasing the volatile composition for at least 300 days.

17. The method of claim 11, wherein the active compound comprises one or more pheromones.

18. The method of claim 11, wherein the pest is an insect selected from a mosquito, a psyllidae, a beetle, a moth, or a combination thereof.

19. The method of claim 11, wherein the solid composition comprises the active composition at a concentration from about 40% to about 50% by volume.

\* \* \* \* \*